(12) United States Patent
Han et al.

(10) Patent No.: US 10,037,452 B2
(45) Date of Patent: Jul. 31, 2018

(54) FINGERPRINT SENSOR ARRAY AND DISPLAY DEVICE HAVING THE SAME

(71) Applicant: LG Display Co., Ltd., Seoul (KR)

(72) Inventors: Manhyeop Han, Seoul (KR); Kyoseop Choo, Gyeonggi-do (KR); Jiho Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 194 days.

(21) Appl. No.: 14/982,158

(22) Filed: Dec. 29, 2015

(65) Prior Publication Data

US 2017/0091508 A1 Mar. 30, 2017

(30) Foreign Application Priority Data

Sep. 30, 2015 (KR) .................. 10-2015-0138249

(51) Int. Cl.
*G06K 9/00* (2006.01)
*G06F 3/041* (2006.01)

(52) U.S. Cl.
CPC .......... *G06K 9/0002* (2013.01); *G06F 3/041* (2013.01)

(58) Field of Classification Search
USPC ................................................ 382/124–127
See application file for complete search history.

(56) References Cited

U.S. PATENT DOCUMENTS

| 8,564,314 B2 | 10/2013 | Shaikh et al. |
| 2004/0021786 A1* | 2/2004 | Nakamura ........... G06K 9/0004 348/294 |
| 2010/0073325 A1* | 3/2010 | Yang ....................... G06F 3/044 345/174 |
| 2013/0307818 A1 | 11/2013 | Pope et al. |

FOREIGN PATENT DOCUMENTS

KR 10-1432988 B1 8/2014

* cited by examiner

*Primary Examiner* — Alex Liew
(74) *Attorney, Agent, or Firm* — Morgan, Lewis & Bockius LLP

(57) ABSTRACT

Provided are a fingerprint sensor and a display device including the same. A fingerprint sensor array includes: a plurality of first electrodes arranged in a first direction, each of the plurality of first electrodes including at least one of: a first transparent electrode including a transparent conductive material and a first metal electrode including a low-resistance metal material; a plurality of second electrodes arranged in a second direction crossing the first direction, each of the plurality of second electrodes including at least one of: a second transparent electrode including the transparent conductive material and a second metal electrode including the low-resistance metal material; and an insulating layer between the plurality of first electrodes and the plurality of second electrodes to insulate the first electrodes from the second electrodes.

23 Claims, 24 Drawing Sheets

FINGERPRINT SENSOR ARRAY AND DISPLAY DEVICE HAVING THE SAME

CROSS-REFERENCE TO RELATED APPLICATION(S)

This application claims the benefit of Korean Patent Application No. 10-2015-0138249, filed on Sep. 30, 2015, the entire disclosure of which is hereby incorporated by reference herein for all purposes.

BACKGROUND

1. Technical Field

The present disclosure relates to a fingerprint sensor and a display device including the same.

2. Discussion of the Related Art

As computer technology advances, computer-based systems for various purposes, such as a notebook computer, a tablet PC, a smart phone, a personal digital assistant, an automated teller machine, and a search guide system, have been developed. Security for these systems needs to be enhanced in order to protect information or data stored in the systems because such information or data may include, e.g., personal information related to private life, and/or business information or business secrets, which require confidentiality.

To this end, there has been generally known a fingerprint sensor capable of enhancing security by performing system registration or authentication using the fingerprint of a finger. The fingerprint sensor detects the fingerprint of a finger of a person. The fingerprint sensor types are an optical fingerprint sensor and a capacitive fingerprint sensor.

The optical fingerprint sensor is based on the principle in which an internal light-emitting diode (LED) radiates a light source, and then light reflected by the ridges of a fingerprint is detected by a CMOS image sensor. The optical fingerprint sensor is limited in its ability to reduce the size because the scan needs to be performed using an LED. Also, the optical fingerprint sensor is problematic in that a manufacturing cost is increased because the light source, itself, is expensive.

In the capacitive fingerprint sensor, a difference in the amount of electricity charged between ridges which touch the fingerprint sensor and valleys is used. Known capacitive fingerprint sensors include U.S. Patent Application Publication No. 2013/0307818 ("the '818 application"), published on Nov. 21, 2013, entitled "Capacitive Sensor Packaging." The capacitive fingerprint sensor disclosed in the '818 application includes a specific push button combined with the sensor in an assembly form and a silicon wafer on which a circuit for measuring capacitance between a capacitive plate and the fingerprint (i.e., ridges and valleys) of a user has been printed.

In general, a ridge and valley of the fingerprint of a human being is very fine, that is, 300 µm~500 µm in size. In the capacitive fingerprint sensor disclosed in the '818 application, a high-resolution sensor array and an integrated chip (IC) for fingerprint recognition and processing need to be fabricated. To this end, the silicon wafer in which the sensor array and the IC are integrated is used.

If the high-resolution sensor array and the IC are integrated using the silicon wafer, however, there are problems in that the configuration becomes complicated, and a non-display area (i.e., a bezel area) size is increased because an assembly structure for coupling the fingerprint sensor and the push button is necessary. Furthermore, there are problems in that the thickness is increased and a fingerprint sensing area depends on the size of the push button because the push button (e.g., the home key of a smart phone) and the fingerprint sensor overlap.

In order to solve such problems, a technology using the area of a touch sensor screen as a fingerprint identification area has been developed. Such a technology includes U.S. Pat. No. 8,564,314 ("the '314 patent"), issued on Oct. 22, 2013, entitled "Capacitive Touch Sensor for Identifying a Fingerprint" and Korean Patent No. 10-1432988 ("the '988 patent"), issued on Aug. 18, 2014, entitled "Fingerprint Recognition-Integrated Type Capacitance Touch Screen."

FIG. 1 of the present disclosure corresponds to FIG. 5 of the '314 patent and is a plan view schematically showing the array of the driving electrodes and sensing electrodes of a related art capacitive sensing panel. FIG. 2 of the present disclosure corresponds to FIG. 3 of the '988 patent and is a plan view showing the configuration of a related art fingerprint recognition-integrated type capacitance touch screen panel.

With reference to FIG. 1 of the present disclosure, a capacitive touch sensor for fingerprint identification includes a touch sensor 403 including touch driving electrodes 401(x) and touch sensing electrodes 401(y) and a fingerprint sensor 405 including fingerprint driving electrodes 405(x) and fingerprint sensing electrodes 405(y). However, the capacitive sensing panel has a problem in that the area of the fingerprint sensor 405 is not touched or touch performance in the surrounding area of the fingerprint sensor 405 is low because the separate fingerprint sensor 405 is partially disposed in the screen (display) area of the capacitive touch sensor.

With reference to FIG. 2, the fingerprint recognition-integrated type capacitance touch screen includes a touch panel 110, electrode connection lines 120, and a touch controller 130. In the configuration of FIG. 2, the touch panel 110 includes fine channels 113, each formed by a combination of a first channel electrode 111 (Tx or Rx), and a second channel electrode 112 (Tx or Rx) arranged to cross each other. Fine channels 113 that belong to the fine channels 113 and that are disposed in the remaining areas other than the area of a fingerprint recognition sensor 114 are plurally grouped and function as touch group channels 115 for detecting a touch signal. Each of the fine channels 113 disposed in the area of the fingerprint recognition sensor 114 functions as a fingerprint recognition channel 116. In the fingerprint recognition-integrated type capacitance touch screen, however, mutual capacitance between the fine channels 113 (i.e., touch channels) is greatly increased due to the touch channels functioning as the touch group channels 115. Accordingly, there is a problem in that a touch is not recognized when a touch operation is generated because such an increase of mutual capacitance causes deterioration of the sensing sensitivity of the touch sensor.

SUMMARY

Accordingly, the present disclosure is directed to a fingerprint sensor and a display device including the same that substantially obviate one or more of the problems due to limitations and disadvantages of the related art.

An object of the present disclosure is to provide a fingerprint sensor array and a display device including the same, which are capable of preventing the dead zone of a touch function from occurring in the area of the fingerprint sensor of a touch screen and of preventing touch performance from being deteriorated because the amount of mutual capacitance is increased by configuring touch electrodes in a fine pattern.

Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided a fingerprint sensor array, including: a plurality of first electrodes arranged in a first direction, each of the plurality of first electrodes including at least one of: a first transparent electrode including a transparent conductive material and a first metal electrode including a low-resistance metal material; a plurality of second electrodes arranged in a second direction crossing the first direction, each of the plurality of second electrodes including at least one of: a second transparent electrode including the transparent conductive material and a second metal electrode including the low-resistance metal material; and an insulating layer between the plurality of first electrodes and the plurality of second electrodes to insulate the first electrodes from the second electrodes.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
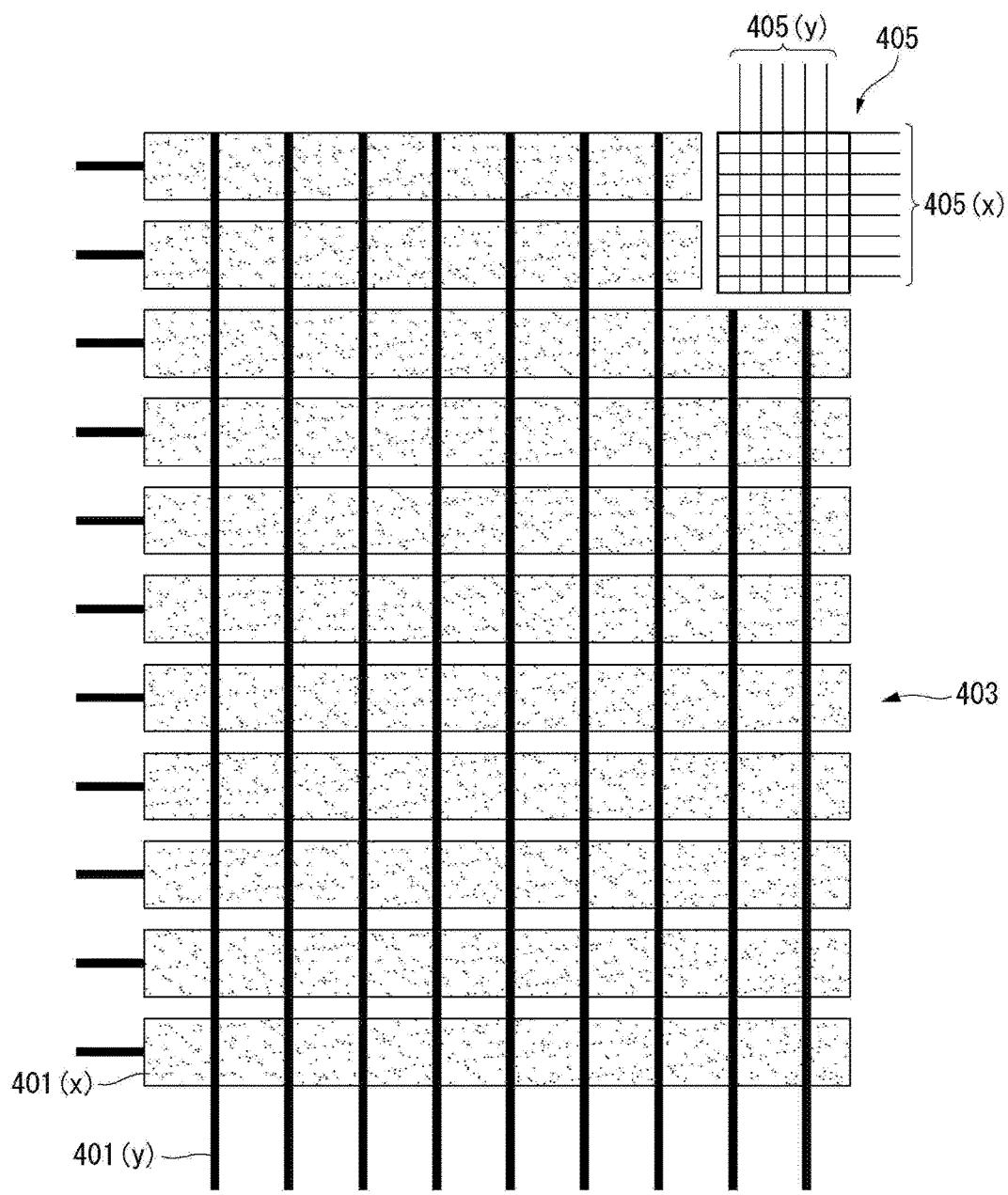
FIG. 1 is a plan view schematically showing the array of the driving electrodes and sensing electrodes of a related art capacitive sensing panel.
Figure 2:
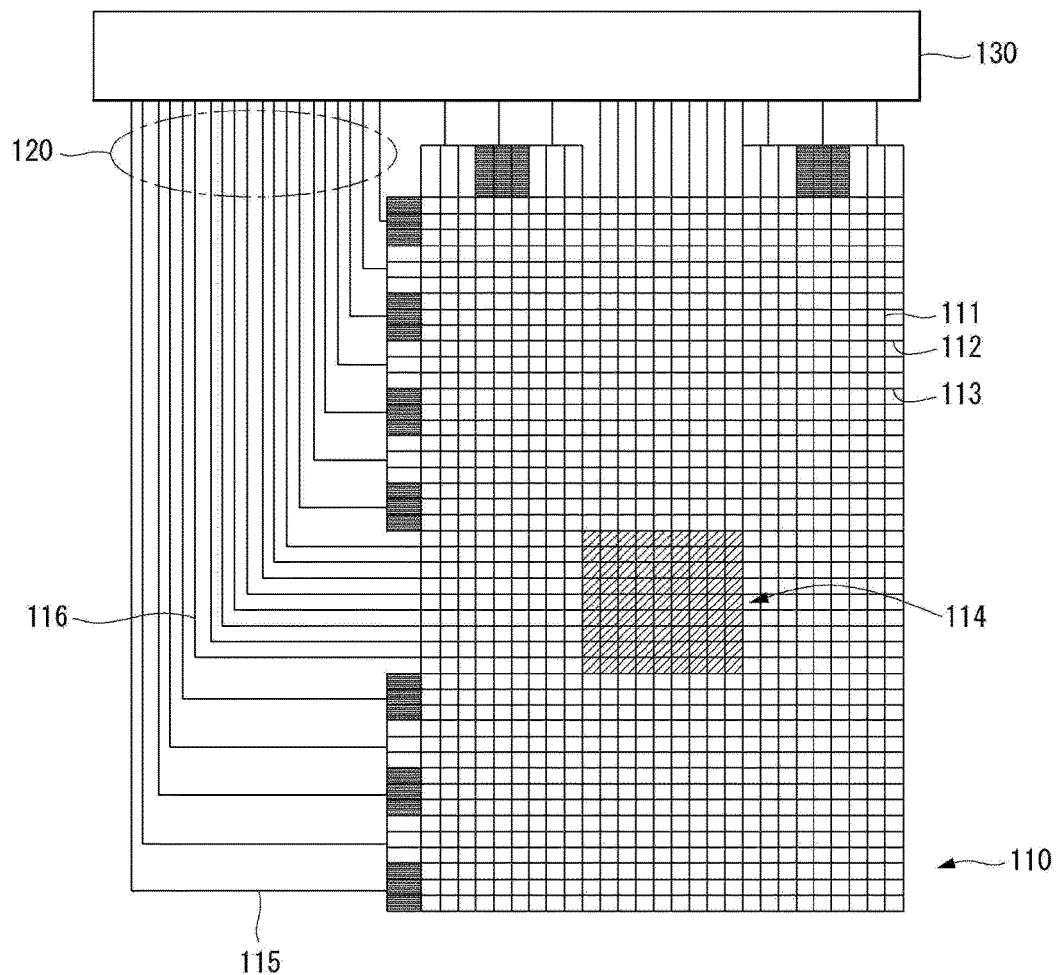
FIG. 2 is a plan view showing the configuration of a related art fingerprint recognition-integrated type touch screen panel.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, example embodiments of the present disclosure will be described in detail with reference to the accompanying drawings.

A fingerprint sensor array according to a first embodiment of the present disclosure is described below with reference to FIGS. 3 to 5B.

Figure 3:
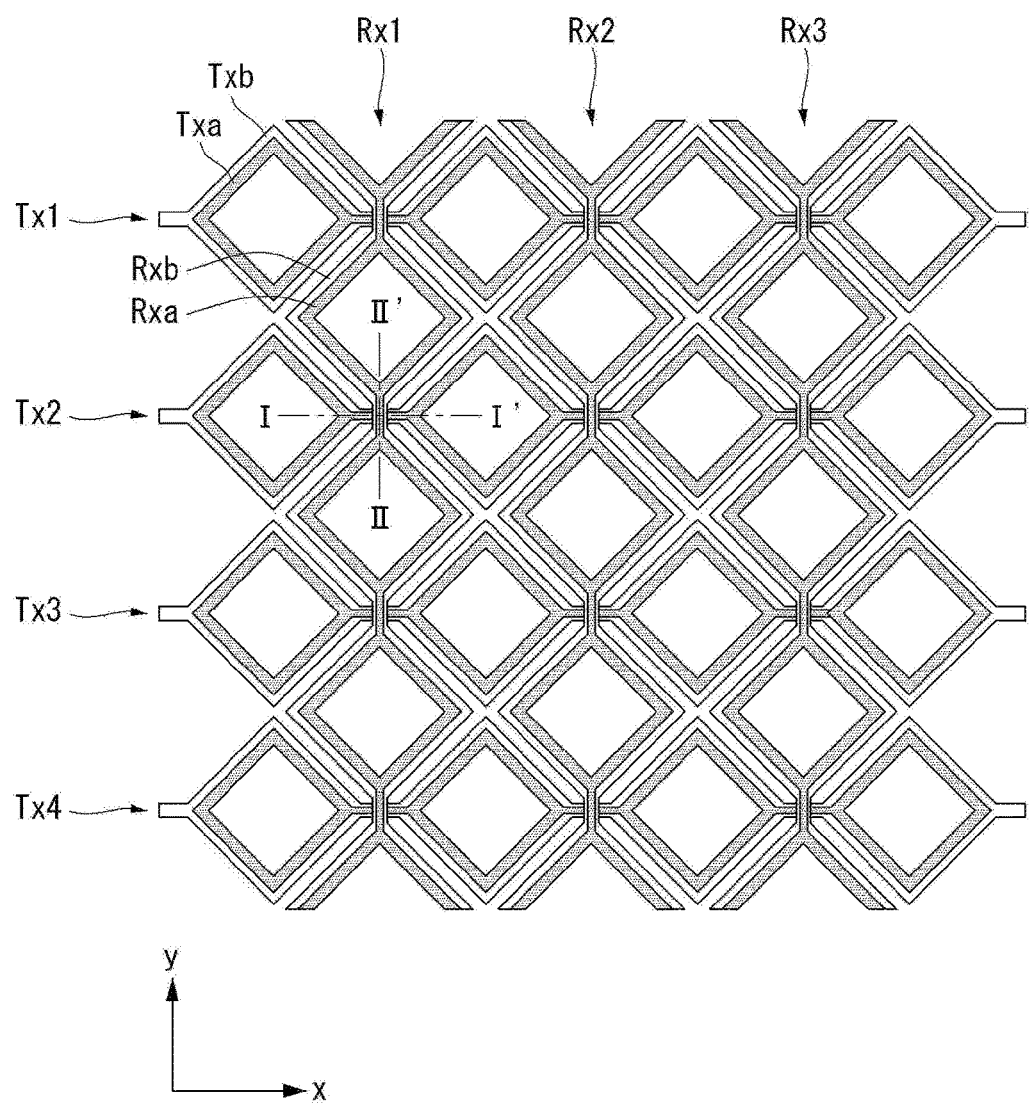
FIG. 3 is a plan view showing a fingerprint sensor array according to a first embodiment of the present disclosure.
Figure 4A:
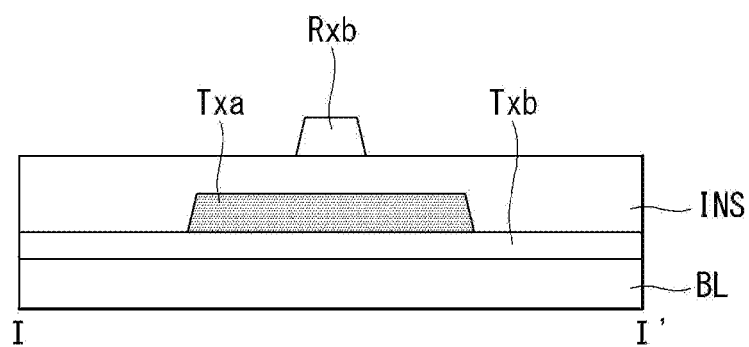
FIG. 4A shows an example of a cross-sectional view of the fingerprint sensor array, which is taken along line I-I' of FIG. 3.
Figure 4B:
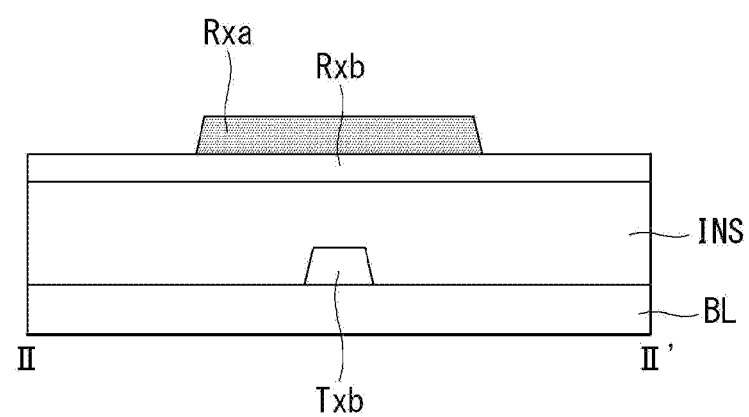
FIG. 4B shows an example of a cross-sectional view of the fingerprint sensor array, which is taken along line II-II' of FIG. 3.
Figure 5A:
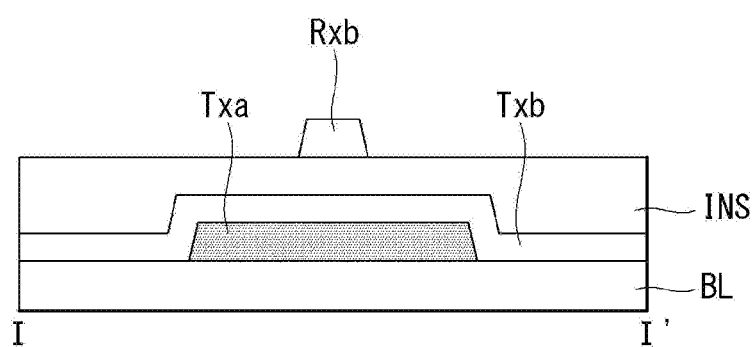
FIG. 5A shows another example of a cross-sectional view of the fingerprint sensor array, which is taken along line I-I' of FIG. 3.
Figure 5B:
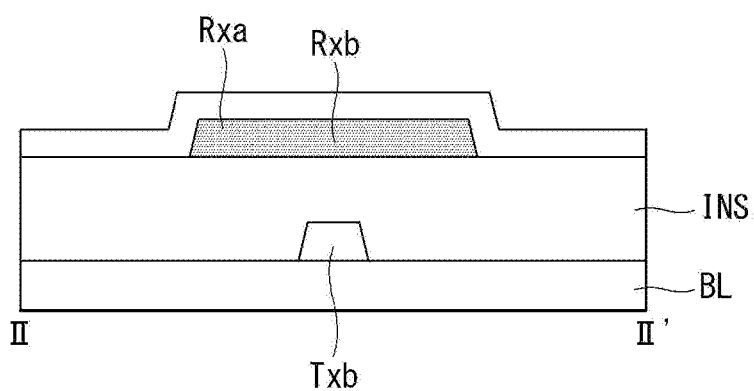
FIG. 5B shows another example of a cross-sectional view of the fingerprint sensor array, which is taken along line II-II' of FIG. 3.

FIG. 3 is a plan view showing the fingerprint sensor array according to the first embodiment of the present disclosure. FIG. 4A shows an example of a cross-sectional view of the fingerprint sensor array, which is taken along line I-I' of FIG. 3. FIG. 4B shows an example of a cross-sectional view of the fingerprint sensor array, which is taken along line II-II' of FIG. 3. FIG. 5A shows another example of a cross-sectional view of the fingerprint sensor array, which is taken along line I-I' of FIG. 3. FIG. 5B shows another example of a cross-sectional view of the fingerprint sensor array, which is taken along line II-II' of FIG. 3.

With reference to the examples of FIGS. 3, 4A, and 4B, first electrodes Tx1-Tx4 arranged in parallel in a first direction (e.g., an x-axis direction) and second electrodes Rx1-Rx3 arranged in parallel in a second direction (e.g., a y-axis direction) crossing the first direction may be disposed on a base layer BL. An insulating layer INS may be placed between the first electrodes Tx1-Tx4 and the second electrodes Rx1-Rx3, and may prevent an electrical contact between them.

Each of the first electrodes Tx1-Tx4 may include a first metal electrode Txa made of a low-resistance metal material and a first transparent electrode Txb made of a transparent conductive material. The first transparent electrode Txb may be made of the transparent conductive material, such as indium tin oxide (ITO), indium zinc oxide (IZO), or gallium-doped zinc oxide (GZO), and may be disposed on the base layer BL. The first transparent electrode Txb may include a plurality of first transparent patterns having a shape, such as a rectangle, a diamond shape, a honeycomb, a circle, or an oval, and connection parts interconnecting the plurality of first transparent patterns in the first direction.

The first metal electrode Txa may be made of the low resistance metal material, such as Al, AlNd, Mo, MoTi, Cu, Cr, Ag, or an Ag-series alloy, and may be disposed on the first transparent patterns of the first transparent electrode Txb. The first metal electrode Txa may further include a first opening portion through which some region of the first transparent patterns may be exposed. Accordingly, the first metal electrode Txa may have a frame shape. The first metal electrodes Txa having the frame shapes may be interconnected in the first direction, and may have a mesh form to reduce electrical resistance. The insulating layer INS may be disposed on the base layer BL on which the first electrodes Tx1-Tx4 have been disposed so that the insulating layer INS covers the first electrodes.

Second electrodes Rx1-Rx3 may be arranged in parallel in the second direction on the insulating layer INS. Each of the second electrodes Rx1-Rx3 may include a second metal electrode Rxa made of a low-resistance metal material and a second transparent electrode Rxb made of a transparent conductive material.

Similarly to the first transparent electrode Txb, the second transparent electrode Rxb may be made of the transparent conductive material, such as ITO, IZO, or GZO, and may be disposed on the insulating layer INS. Similarly to the first transparent electrode Txb, the second transparent electrode Rxb may include a plurality of second transparent patterns having a shape, such as a rectangle, a diamond shape, a honeycomb, a circle, or an oval, and connection parts interconnecting the plurality of second transparent patterns in the second direction.

Similarly to the first metal electrode Txa, the second metal electrode Rxa may be made of the low resistance metal material, such as Al, AlNd, Mo, MoTi, Cu, Cr, Ag, or an Ag-series alloy, and may be disposed on the second transparent patterns of the second transparent electrode Rxb. The second metal electrode Rxa may further include a second opening portion through which some region of the second transparent patterns may be exposed.

Similarly to the first metal electrode Txa, the second metal electrode Rxa may have a frame shape. The second metal electrodes Rxa having the frame shapes may be interconnected in the second direction, and may have a mesh form to reduce electrical resistance.

With reference to FIGS. 3, 5A, and 5B, the example of FIGS. 5A and 5B is substantially similar to that of the example of FIGS. 4A-4B, except that the locations of the first metal electrode Txa and first transparent electrode Txb of each of the first electrodes Tx1-Tx4 are reversed up and down (e.g., switched vertically) and the locations of the second metal electrode Rxa and second transparent electrode Rxb of each of the second electrodes Rx1-Rx3 are reversed up and down (e.g., switched vertically). That is, the example of FIGS. 5A-5B is different from that of the example of FIGS. 4A and 4B in that the first metal electrode Txa is disposed on the base layer BL, and the first transparent electrode Txb is disposed on the base layer BL so that it covers the first metal electrode Txa. Furthermore, the example of FIGS. 5A-5B is different from that of the example of FIGS. 4A-4B in that the second metal electrode Rxa is disposed on the insulating layer INS, and the second transparent electrode Rxb is disposed on the insulating layer INS so that it covers the second metal electrode Rxa. Accordingly, a detailed description of the redundant portions is omitted.

Unlike in the example of FIGS. 4A-4B, in the example of FIGS. 5A-5B, the first metal electrode Txa may be disposed on the base layer BL, the first transparent electrode Txb may be disposed on the base layer BL so that it covers the first metal electrode Txa, the second transparent electrode Rxb may be disposed on the insulating layer INS, and the second metal electrode Rxa may be disposed on the second transparent electrode Rxb. In some embodiments, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed on the second transparent electrode Rxb.

In accordance with the fingerprint sensor array according to the first embodiment of the present disclosure, electrical resistance can be reduced and the amount of mutual capacitance formed between the first electrodes Tx1-Tx4 and the second electrodes Rx1-Rx3 can also be secured because the first electrodes Tx1-Tx4 and the second electrodes Rx1-Rx3 include the transparent electrodes Txb and Rxb made of the transparent conductive material and the metal electrodes Txa and Rxa made of the low-resistance metal material. Accordingly, there may be an advantage in that the precision of fingerprint sensing can be improved.

Furthermore, if the fingerprint sensor array according to the first embodiment of the present disclosure is applied to a display device including a pixel area, the first and the second metal electrodes Txa and Rxa may be disposed to overlap a black matrix or a bank defining the pixel area of the display device, and the first opening portion and the second opening portion may be disposed to correspond to the pixel area of the display device. In this case, there may be an advantage in that resolution of a fingerprint sensor and resolution of the display device can be maintained almost identically.

A fingerprint sensor array according to a second embodiment of the present disclosure is described below with reference to FIGS. 6 to 8B.

Figure 6:
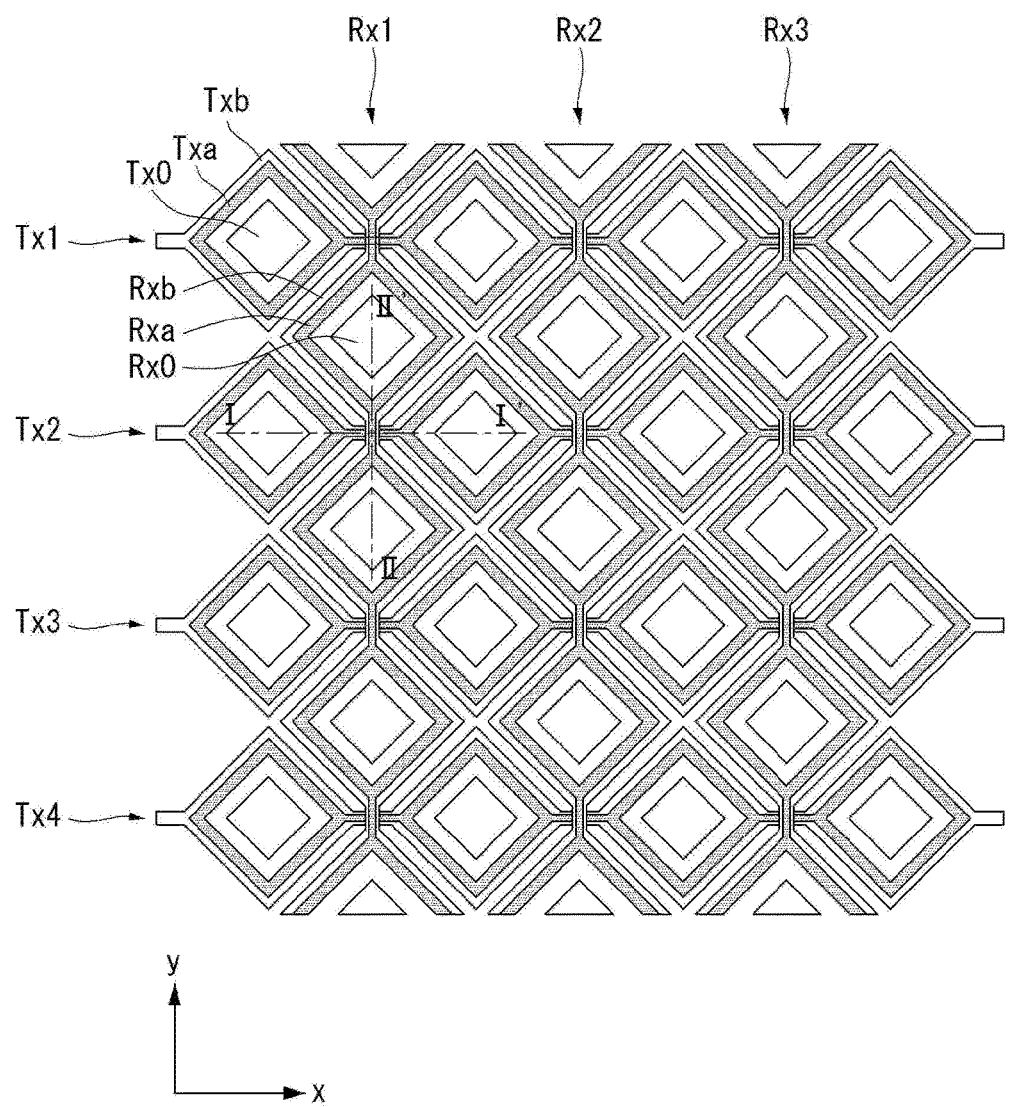
FIG. 6 is a plan view showing a fingerprint sensor array according to a second embodiment of the present disclosure.
Figure 7A:
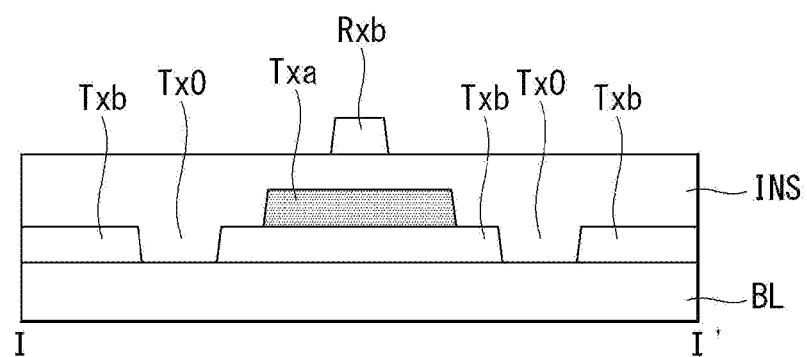
FIG. 7A shows an example of a cross-sectional view of the fingerprint sensor array, which is taken along line I-I' of FIG. 6.
Figure 7B:
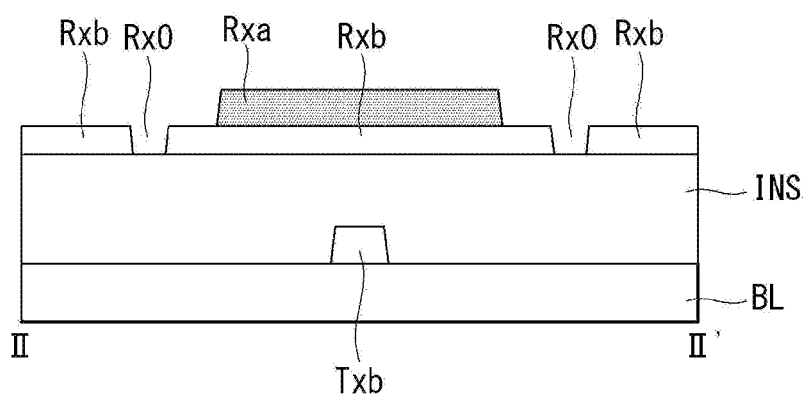
FIG. 7B shows an example of a cross-sectional view of the fingerprint sensor array, which is taken along line II-II' of FIG. 6.
Figure 8A:
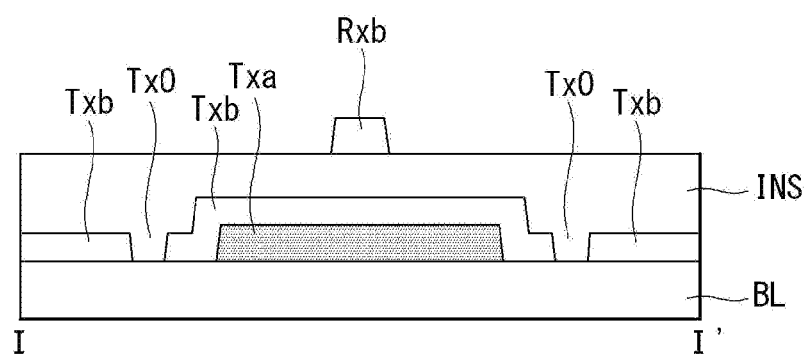
FIG. 8A shows another example of a cross-sectional view of the fingerprint sensor array, which is taken along line I-I' of FIG. 6.
Figure 8B:
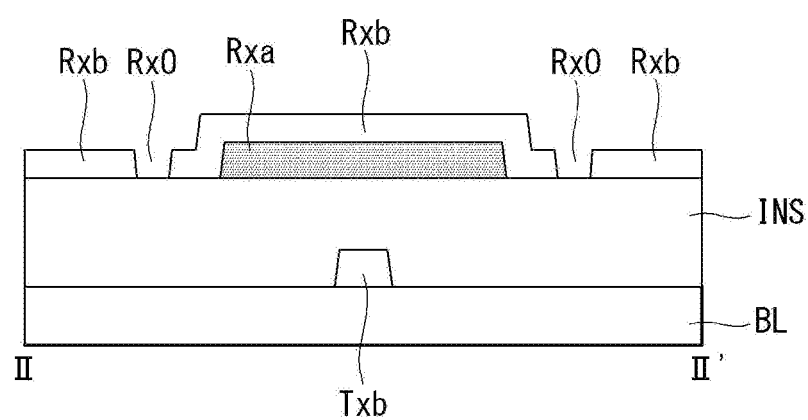
FIG. 8B shows another example of a cross-sectional view of the fingerprint sensor array, which is taken along line II-II' of FIG. 6.

FIG. 6 is a plan view showing the fingerprint sensor array according to the second embodiment of the present disclosure. FIG. 7A shows an example of a cross-sectional view of the fingerprint sensor array, which is taken along line I-I' of FIG. 6. FIG. 7B shows an example of a cross-sectional view of the fingerprint sensor array, which is taken along line II-II' of FIG. 6. FIG. 8A shows another example of a cross-sectional view of the fingerprint sensor array, which is taken along line I-I' of FIG. 6. FIG. 8B shows another example of a cross-sectional view of the fingerprint sensor array, which is taken along line II-II' of FIG. 6.

With reference to the examples of FIGS. 6, 7A, 7B, 8A, and 8B, the fingerprint sensor array according to the second embodiment of the present disclosure has a substantially similar configuration as the fingerprint sensor array according to the first embodiment of the present disclosure, except that the first transparent electrode Txb of each of the first electrodes Tx1-Tx4 includes a third opening portion Tx0 and the second transparent electrode Rxb of each of the second electrodes Rx1-Rx3 has a fourth opening portion Rx0. Accordingly, a description of portions redundant with those of the first embodiment is omitted.

A configuration according to the example of FIGS. 7A-7B is similar to that of the example of FIGS. 4A and 4B in that the first transparent electrode Txb is disposed on the base layer BL, the first metal electrode Txa may be disposed on the first transparent electrode Txb, the second metal electrode Rxa may be disposed on the insulating layer INS, and the second transparent electrode Rxb may be disposed on the insulating layer INS so that it covers the second metal electrode Rxa.

Furthermore, a configuration according to the example of FIGS. 8A-8B is similar to that of the example of FIGS. 5A and 5B in that the first metal electrode Txa may be disposed on the base layer BL, the first transparent electrode Txb may be disposed on the base layer BL so that it covers the first metal electrode Txa, the second metal electrode Rxa may be disposed on the insulating layer INS, and the second transparent electrode Rxb may be disposed on the insulating layer INS so that it covers the second metal electrode Rxa.

Unlike in the example of FIGS. 7A-7B, in the example of FIGS. 8A-8B, the first metal electrode Txa may be disposed on the base layer BL, the first transparent electrode Txb may be disposed on the base layer BL so that it covers the first metal electrode Txa, the second transparent electrode Rxb may be disposed on the insulating layer INS, and the second metal electrode Rxa may be disposed on the second transparent electrode Rxb. In some embodiments, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed on the second transparent electrode Rxb.

In accordance with the fingerprint sensor array according to the second embodiment of the present disclosure, electrical resistance can be reduced and the amount of mutual capacitance formed between the first electrodes Tx1-Tx4 and the second electrodes Rx1-Rx3 can also be secured because the first electrodes Tx1-Tx4 and the second electrodes Rx1-Rx3 include the transparent electrodes Txb and Rxb made of the transparent conductive material and the metal electrodes Txa and Rxa made of the low-resistance metal material. Accordingly, there may be an advantage in that the precision of fingerprint sensing can be improved.

Furthermore, if the fingerprint sensor array according to the second embodiment of the present disclosure is applied to a display device including a pixel area, the first and the second metal electrodes Txa and Rxa may be disposed to overlap a black matrix or a bank defining the pixel area of the display device, and the third opening portion Tx0 and the fourth opening portion Rx0 may be disposed to correspond to the pixel area of the display device. In this case, there may be an advantage in that resolution of a fingerprint sensor and resolution of the display device can be identically maintained.

A fingerprint sensor array according to a third embodiment of the present disclosure is described below with reference to FIGS. 9 to 10B.

Figure 9:
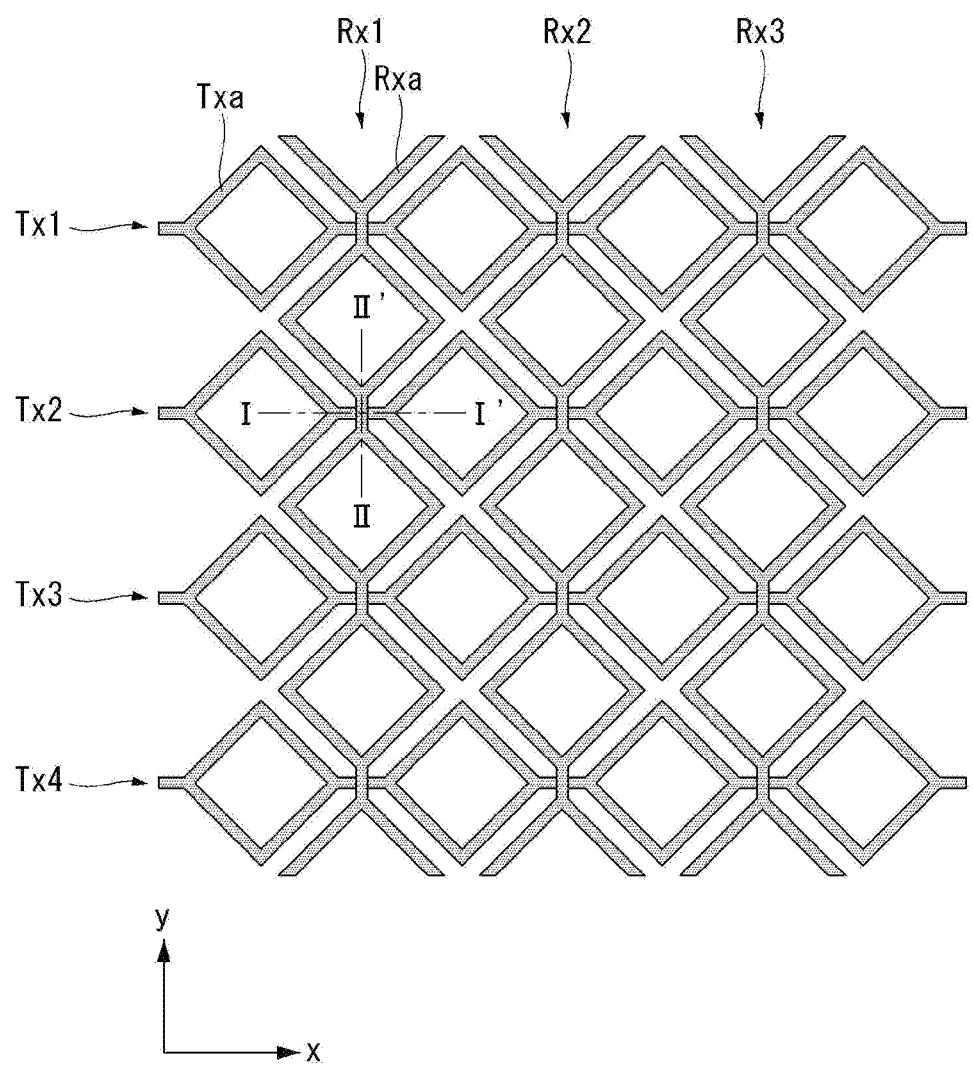
FIG. 9 is a plan view showing a fingerprint sensor array according to a third embodiment of the present disclosure.
Figure 10A:
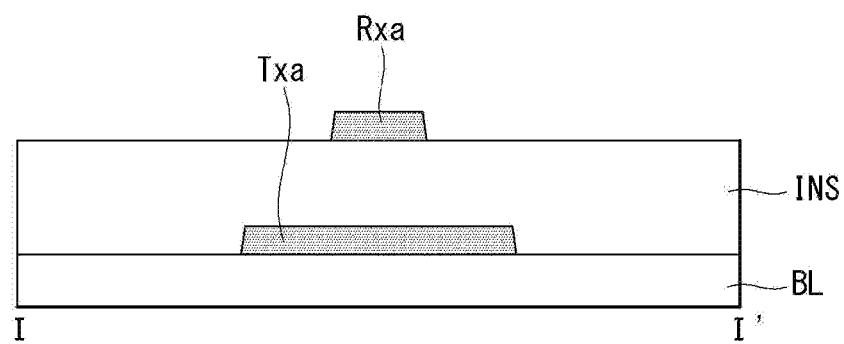
FIG. 10A shows an example of a cross-sectional view of the fingerprint sensor array, which is taken along line I-I' of FIG. 9.

FIG. 9 is a plan view showing the fingerprint sensor array according to the third embodiment of the present disclosure. FIG. 10A shows an example of a cross-sectional view of the fingerprint sensor array, which is taken along line I-I' of FIG. 9. FIG. 10B shows an example of a cross-sectional view of the fingerprint sensor array, which is taken along line II-II' of FIG. 9.

Figure 10B:
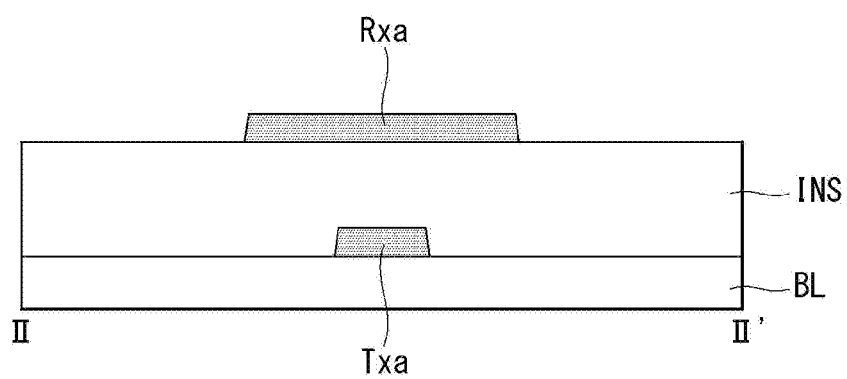
FIG. 10B shows an example of a cross-sectional view of the fingerprint sensor array, which is taken along line II-II' of FIG. 9.

With reference to the examples of FIGS. 9, 10A, and 10B, the fingerprint sensor array according to the third embodiment of the present disclosure has a substantially similar configuration as the fingerprint sensor array according to the first embodiment of the present disclosure, except that each of the first electrodes Tx1-Tx4 includes only the first metal electrode Txa and each of the second electrodes Rx1-Rx3 includes only the second metal electrode Rxa. Accordingly, a description of portions redundant with those of the first embodiment is omitted.

In the example of FIGS. 10A-10B, the first metal electrode Txa may be disposed on the base layer BL, and the second metal electrode Rxa may be disposed on the insulating layer INS. In accordance with the fingerprint sensor array according to the third embodiment of the present disclosure, there may be an advantage in that electrical resistance can be further reduced because the first and the second transparent electrodes Txb and Rxb are omitted.

Furthermore, if the fingerprint sensor array according to the third embodiment of the present disclosure is applied to a display device including a pixel area, the first and the second metal electrodes Txa and Rxa may be disposed to overlap a black matrix or a bank defining the pixel area of the display device and the third opening portion Tx0 and the fourth opening portion Rx0 may be disposed to correspond to the pixel area of the display device. In this case, there may be an advantage in that resolution of a fingerprint sensor can be maintained in the same manner as resolution of the display device.

A fingerprint sensor array according to a fourth embodiment of the present disclosure is described below with reference to FIGS. 11 to 12B.

Figure 11:
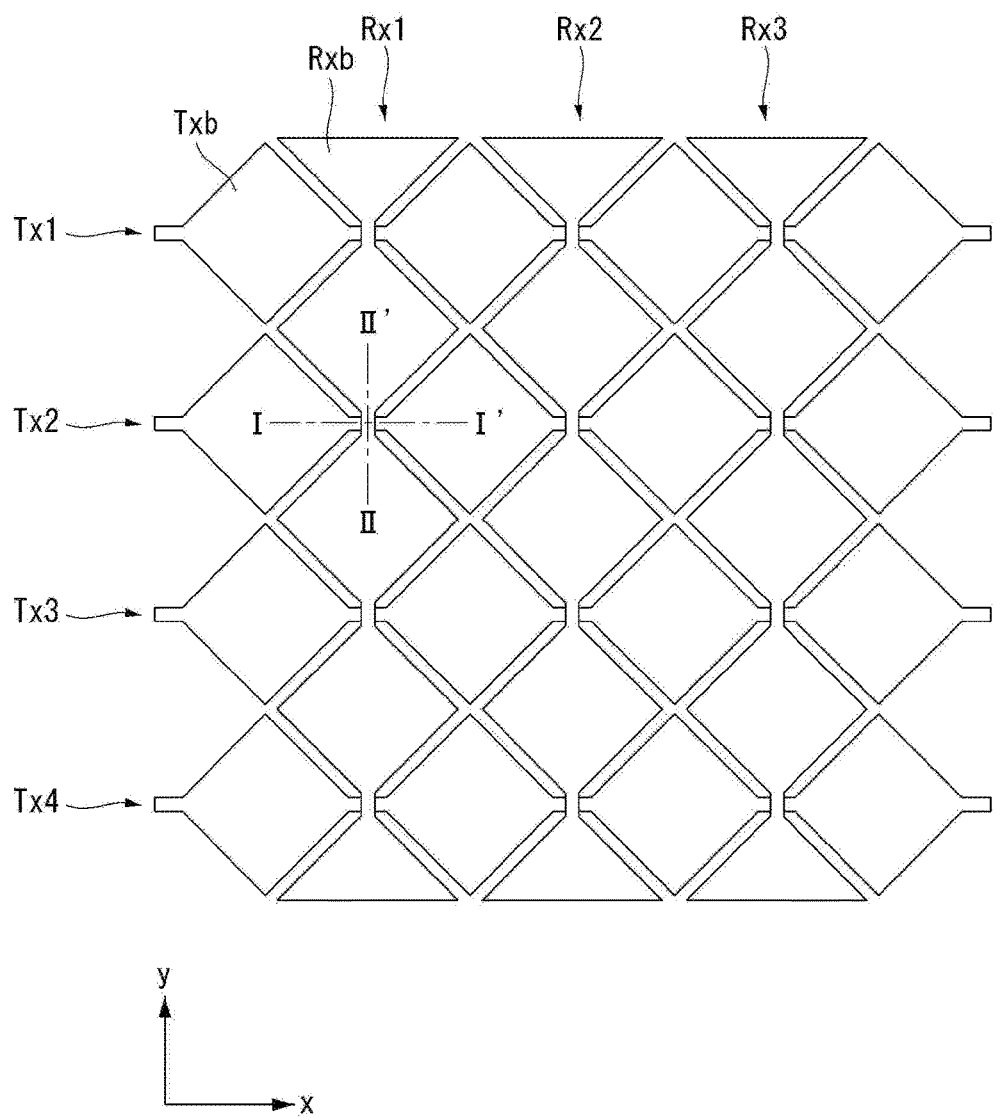
FIG. 11 is a plan view showing a fingerprint sensor array according to a fourth embodiment of the present disclosure.
Figure 12A:
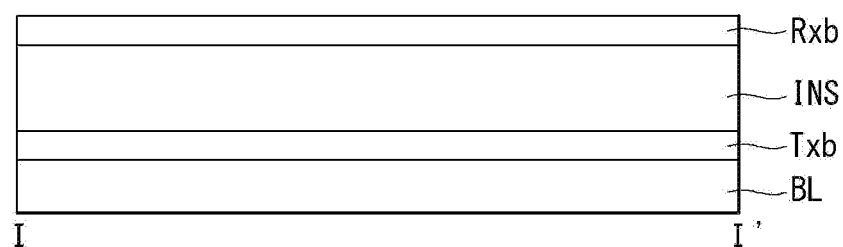
FIG. 12A shows an example of a cross-sectional view of the fingerprint sensor array, which is taken along line I-I' of FIG. 11.

FIG. 11 is a plan view showing the fingerprint sensor array according to the fourth embodiment of the present disclosure. FIG. 12A shows an example of a cross-sectional view of the fingerprint sensor array, which is taken along line I-I' of FIG. 11. FIG. 12B shows an example of a cross-sectional view of the fingerprint sensor array, which is taken along line II-II' of FIG. 11.

Figure 12B:
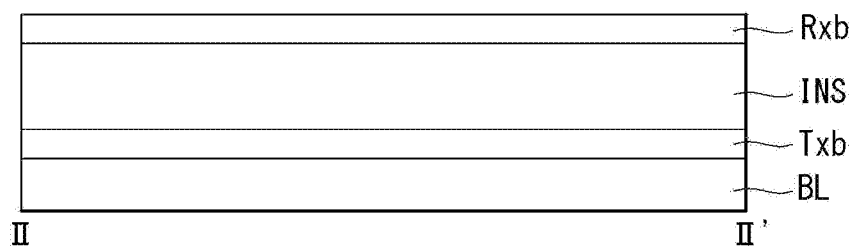
FIG. 12B shows an example of a cross-sectional view of the fingerprint sensor array, which is taken along line II-II' of FIG. 11.

With reference to the examples of FIGS. 11, 12A, and 12B, the fingerprint sensor array according to the third embodiment of the present disclosure has a substantially similar configuration as the fingerprint sensor array according to the first embodiment of the present disclosure, except that each of the first electrodes Tx1-Tx4 includes only the first transparent electrode Txb and each of the second electrodes Rx1-Rx3 includes only the second transparent electrode Rxb. Accordingly, a description of portions redundant with those of the first embodiment is omitted.

In the example of FIGS. 12A-12B, the first transparent electrode Txb may be disposed on the base layer BL, and the second transparent electrode Rxb may be disposed on the insulating layer INS. In accordance with the fingerprint sensor array according to the fourth embodiment of the present disclosure, there may be an advantage in that visibility can be improved because the first and the second metal electrodes Txa and Rxa are omitted.

Furthermore, if the fingerprint sensor array according to the fourth embodiment of the present disclosure is applied to a display device including a pixel area, the first and the second transparent electrodes Txb and Rxb may be disposed to correspond to the pixel area of the display device. In this case, there may be an advantage in that resolution of a fingerprint sensor and resolution of the display device can be maintained almost identically.

A fingerprint sensor array according to a fifth embodiment of the present disclosure is described below with reference to FIGS. 13 to 15B.

Figure 13:
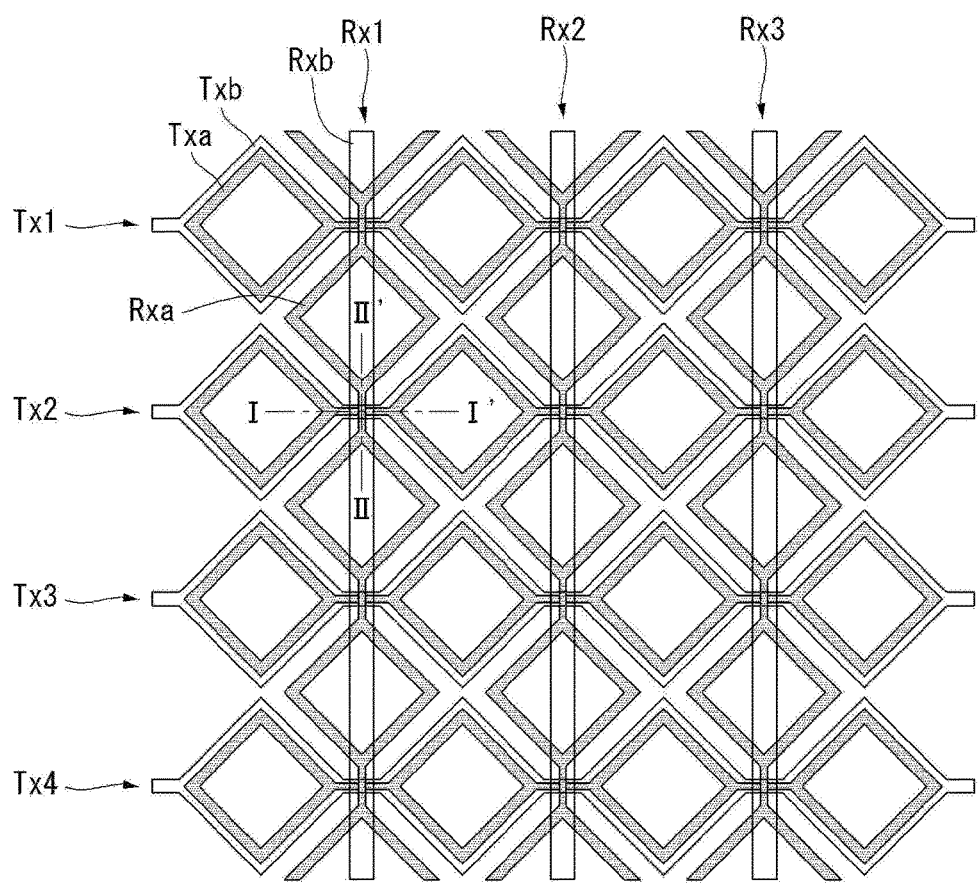
FIG. 13 is a plan view showing a fingerprint sensor array according to a fifth embodiment of the present disclosure.
Figure 14A:
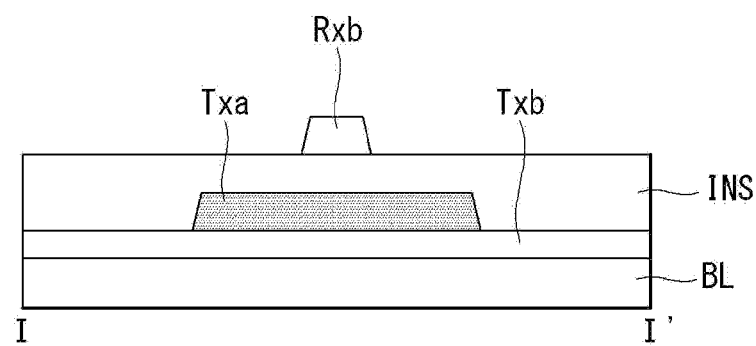
FIG. 14A shows an example of a cross-sectional view of the fingerprint sensor array, which is taken along line I-I' of FIG. 13.
Figure 14B:
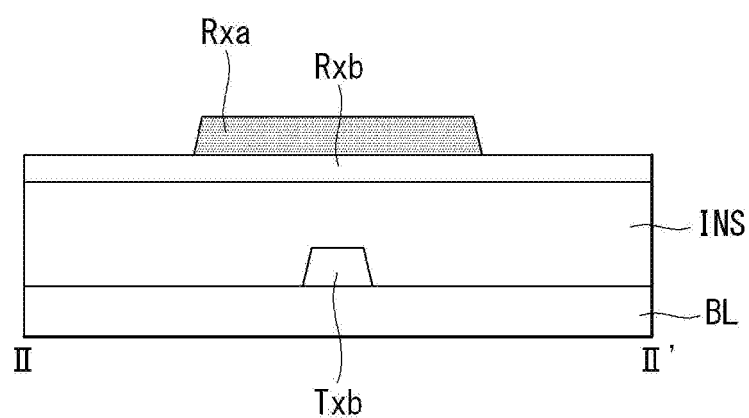
FIG. 14B shows an example of a cross-sectional view of the fingerprint sensor array, which is taken along line II-II' of FIG. 13.
Figure 15A:
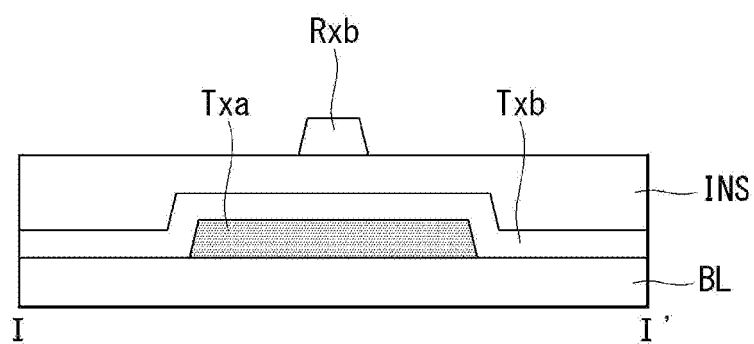
FIG. 15A shows another example of a cross-sectional view of the fingerprint sensor array, which is taken along line I-I' of FIG. 13.
Figure 15B:
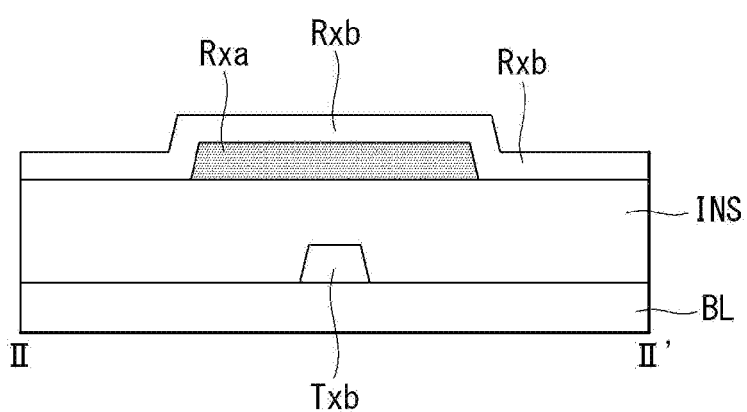
FIG. 15B shows another example of a cross-sectional view of the fingerprint sensor array, which is taken along line II-II' of FIG. 13.

FIG. 13 is a plan view showing the fingerprint sensor array according to the fifth embodiment of the present disclosure. FIG. 14A shows an example of a cross-sectional view of the fingerprint sensor array, which is taken along line I-I' of FIG. 13. FIG. 14B shows an example of a cross-sectional view of the fingerprint sensor array, which is taken along line II-II' of FIG. 13. FIG. 15A shows another example of a cross-sectional view of the fingerprint sensor array, which is taken along line I-I' of FIG. 13. FIG. 15B shows another example of a cross-sectional view of the fingerprint sensor array, which is taken along line II-II' of FIG. 13.

With reference to the examples of FIGS. 13, 14A, and 14B, first electrodes Tx1-Tx4 arranged in parallel in a first direction (e.g., an x-axis direction) and second electrodes Rx1-Rx3 arranged in parallel in a second direction (e.g., a x-axis direction) crossing the first direction may be disposed on a base layer BL. An insulating layer INS may be placed between the first electrodes Tx1-Tx4 and the second electrodes Rx1-Rx3, and may prevent an electrical contact between them.

Each of the first electrodes Tx1-Tx4 of the fingerprint sensor array according to the fifth embodiment of the present disclosure has a substantially similar configuration as each of the first electrodes Tx1-Tx4 of the fingerprint sensor array according to the first embodiment of the present disclosure. Accordingly, a detailed description of the first electrodes Tx1-Tx4 is omitted.

The insulating layer INS may be disposed on the base layer BL on which the first electrodes Tx1-Tx4 have been disposed so that it covers the first electrodes. The second electrodes Rx1-Rx3 may be arranged in parallel in the second direction on the insulating layer INS. Each of the second electrodes Rx1-Rx3 may include a second metal electrode Rxa made of a low-resistance metal material and a second transparent electrode Rxb made of a transparent conductive material.

Similarly to the first and the second transparent electrodes Txb and Rxb of the fingerprint sensor array according to the first embodiment, the second transparent electrode Rxb of the fifth embodiment may be made of the transparent conductive material, such as ITO, IZO, or GZO, and may be disposed on the insulating layer INS. Furthermore, unlike in the second transparent electrode Rxb of the fingerprint sensor array according to the first embodiment, the second transparent electrode Rxb of the fifth embodiment may have a bar shape.

Similarly to the first and the second metal electrodes Txa and Rxa of the fingerprint sensor array according to the first embodiment, the second metal electrode Rxa of the fifth embodiment may be made of the low resistance metal material, such as Al, AlNd, Mo, MoTi, Cu, Cr, Ag, or an Ag-series alloy, and may be disposed on the insulating layer INS so that it covers part of the second transparent electrode Rxb while covering part of the second transparent electrode Rxb. For example, each of the independent second metal electrodes Rxa may be disposed on the insulating layer INS so that two parts of the second metal electrode Rxa may overlap the second transparent electrode Rxb. Similarly to the first and the second metal electrodes Txa and Rxa of the fingerprint sensor array according to the first embodiment, the second metal electrode Rxa of the fifth embodiment may have a frame shape like the first metal electrode Txa. The second metal electrodes Rxa having the frame shapes may be interconnected in the second direction, and may have a mesh form to reduce electrical resistance.

In the examples of FIGS. 14A-14B, the first transparent electrode Txb may be disposed on the base layer BL, the first metal electrode Txa may be disposed on the first transparent patterns of the first transparent electrode Txb, the second transparent electrode Rxb may be disposed on the insulating layer INS, and the second metal electrode Rxa may be disposed on the insulating layer INS so that it overlaps part of the second transparent electrode Rxb.

With reference to the examples of FIGS. 13, 15A, and 15B, the example of FIGS. 15A-15B is substantially similar to the example of FIGS. 14A-14B, except that the locations of the first metal electrode Txa and first transparent electrode Txb of each of the first electrodes Tx1-Tx4 are reversed up and down (e.g., switched vertically) and the locations of the second metal electrode Rxa and second transparent electrode Rxb of each of the second electrodes Rx1-Rx3 are reversed up and down (e.g., switched vertically). That is, the example of FIGS. 15A-15B is different from the example of FIGS. 14A-14B in that the first metal electrode Txa is disposed on the base layer BL and the first transparent electrode Txb is disposed on the base layer BL so that it covers the first metal electrode Txa. Furthermore, the example of FIGS. 15A-15B is different from the example of FIGS. 14A-14B in that the second metal electrode Rxa is disposed on the insulating layer INS and the second transparent electrode Rxb is disposed on the insulating layer INS so that it overlaps part of the second metal electrode Rxa. Accordingly, a detailed description is omitted to avoid a redundant description.

Unlike in the example of FIGS. 14A-14B, in the example of FIGS. 15A-15B, the first metal electrode Txa may be disposed on the base layer BL, the first transparent electrode Txb may be disposed on the base layer BL so that it covers the first metal electrode Txa, the second transparent electrode Rxb may be disposed on the insulating layer INS, and the second metal electrode Rxa may be disposed on the insulating layer INS so that it overlaps part of the second transparent electrode Rxb.

In some embodiments, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed so that it overlaps part of the second transparent electrode Rxb.

In accordance with the fingerprint sensor array according to the fifth embodiment of the present disclosure, electrical resistance can be reduced and the amount of mutual capacitance formed between the first electrodes Tx1-Tx4 and the second electrodes Rx1-Rx3 can also be secured because the first electrodes Tx1-Tx4 and the second electrodes Rx1-Rx3 include the transparent electrodes Txb and Rxb made of the transparent conductive material and the metal electrodes Txa and Rxa made of the low-resistance metal material. Accordingly, there may be an advantage in that the precision of fingerprint sensing can be improved.

Furthermore, if the fingerprint sensor array according to the fifth embodiment of the present disclosure is applied to a display device including a pixel area, the first and the second metal electrodes Txa and Rxa may be disposed to overlap a black matrix or a bank defining the pixel area of the display device, and the first opening portion and the second opening portion may be disposed to correspond to the pixel area of the display device. In this case, there may be an advantage in that resolution of a fingerprint sensor and resolution of the display device can be maintained almost identically.

A fingerprint sensor array according to a sixth embodiment of the present disclosure is described below with reference to FIGS. 16 to 18B.

Figure 16:
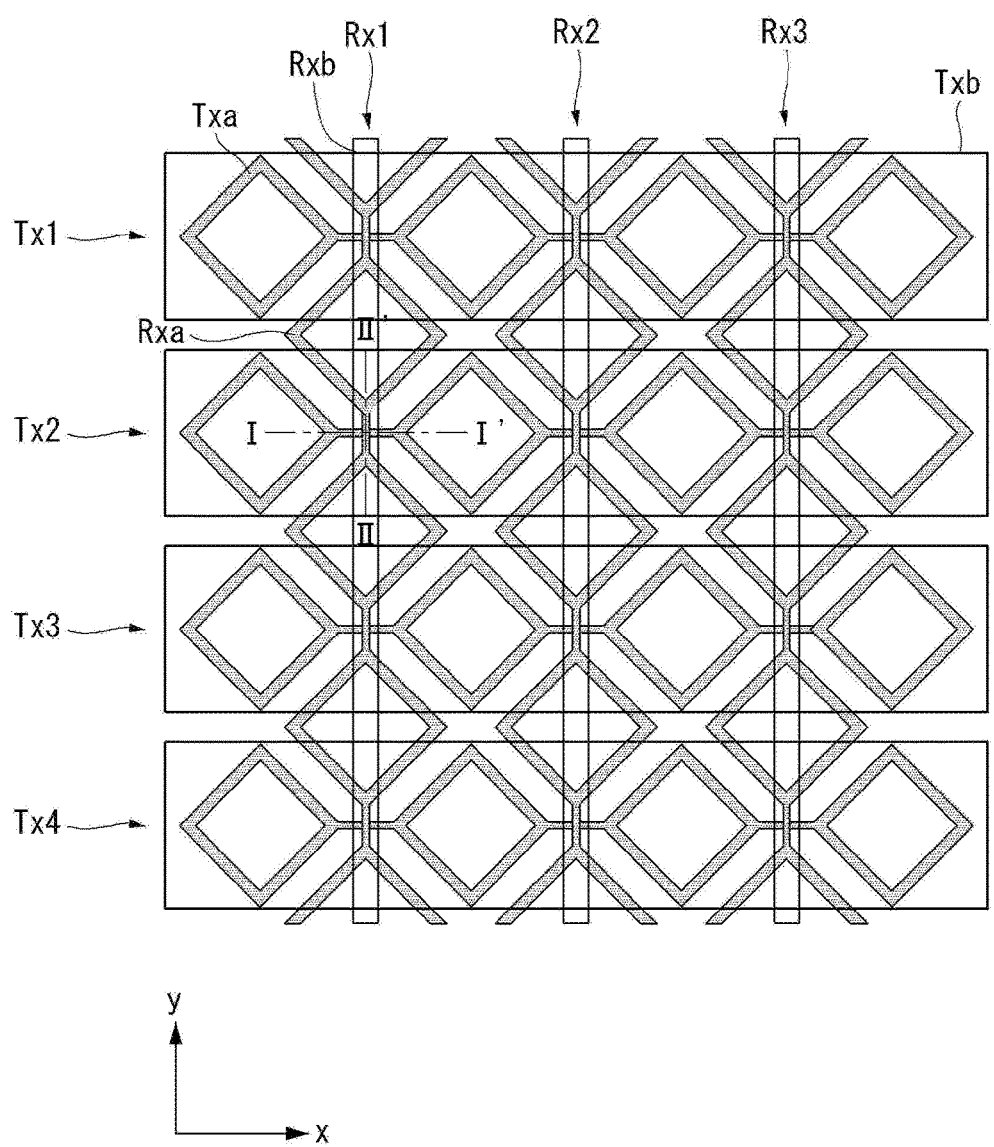
FIG. 16 is a plan view showing a fingerprint sensor array according to a sixth embodiment of the present disclosure.
Figure 17A:
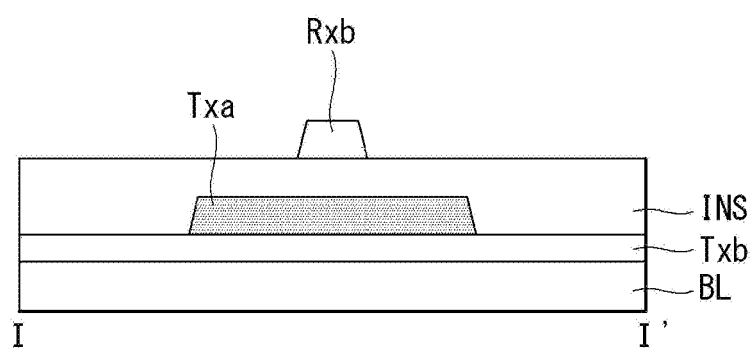
FIG. 17A shows an example of a cross-sectional view of the fingerprint sensor array, which is taken along line I-I' of FIG. 16.
Figure 17B:
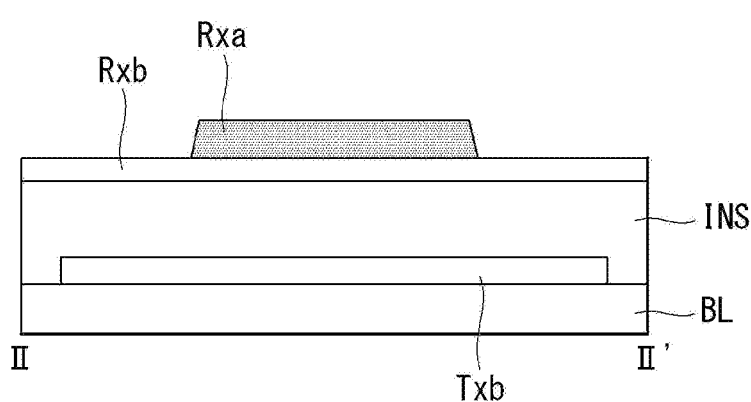
FIG. 17B shows an example of a cross-sectional view of the fingerprint sensor array, which is taken along line II-II' of FIG. 16.
Figure 18A:
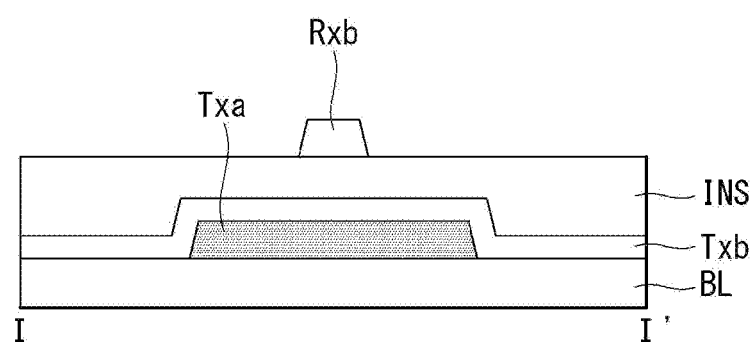
FIG. 18A shows another example of a cross-sectional view of the fingerprint sensor array, which is taken along line I-I' of FIG. 16.
Figure 18B:
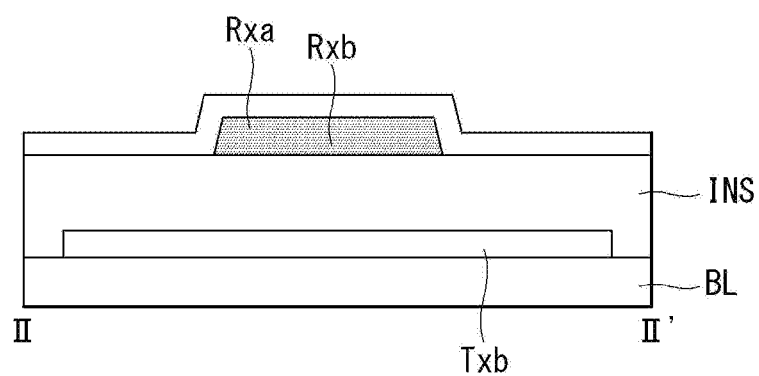
FIG. 18B shows another example of a cross-sectional view of the fingerprint sensor array, which is taken along line II-II' of FIG. 16.

FIG. 16 is a plan view showing the fingerprint sensor array according to the sixth embodiment of the present disclosure. FIG. 17A shows an example of a cross-sectional view of the fingerprint sensor array, which is taken along line I-I' of FIG. 16. FIG. 17B shows an example of a cross-sectional view of the fingerprint sensor array, which is taken along line II-II' of FIG. 16. FIG. 18A shows another example of a cross-sectional view of the fingerprint sensor array, which is taken along line I-I' of FIG. 16. FIG. 18B shows another example of a cross-sectional view of the fingerprint sensor array, which is taken along line II-II' of FIG. 16.

With reference to the examples of FIGS. 16, 17A, and 17B, first electrodes Tx1-Tx4 arranged in parallel in a first direction (e.g., an x-axis direction) and second electrodes Rx1-Rx3 arranged in parallel in a second direction (e.g., a y-axis direction) crossing the first direction may be disposed on a base layer BL. An insulating layer INS may be placed between the first electrodes Tx1-Tx4 and the second electrodes Rx1-Rx3, and may prevent an electrical contact between them.

Each of the first electrodes Tx1-Tx4 of the fingerprint sensor array according to the sixth embodiment of the present disclosure includes a first metal electrode Txa made of a low-resistance metal material and a first transparent electrode Txb made of a transparent conductive material. The insulating layer INS may be disposed on the base layer BL on which the first electrodes Tx1-Tx4 have been disposed so that it covers the first electrodes.

Like the first and the second transparent electrodes Txb and Rxb of the fingerprint sensor array according to the first embodiment, the first transparent electrode Txb may be disposed on the base layer BL made of the transparent conductive material, such as ITO, IZO, or GZO. The first transparent electrode Txb may have a bar shape, and may be arranged in the first direction.

Similarly to the first and the second metal electrodes Txa and Rxa of the fingerprint sensor array according to the first embodiment, the first metal electrode Txa of the sixth embodiment may be made of the low resistance metal material, such as Al, AlNd, Mo, MoTi, Cu, Cr, Ag, or an Ag-series alloy. The first metal electrode Txa may be disposed on the first transparent electrode Txb. Furthermore, the first metal electrode Txa may include a first opening portion through which some region of the first transparent electrode Txb may be exposed. Accordingly, the first metal electrode Txa may have a frame shape. The first metal electrodes Txa having the frame shapes may be interconnected in the first direction, and may have a mesh form in order to reduce electrical resistance.

Second electrodes Rx1-Rx3 may be arranged in parallel in a second direction on an insulating layer INS. Each of the second electrodes Rx1-Rx3 of the sixth embodiment is substantially similar to the second electrodes Rx1-Rx3 of the fingerprint sensor array according to the fifth embodiment. Accordingly, a detailed description of the second electrodes Rx1-Rx3 is omitted.

In the examples of FIGS. 16, 17A, and 17B, the first transparent electrode Txb may be disposed on the base layer BL, the first metal electrode Txa may be disposed on the first transparent patterns of the first transparent electrode Txb, a second transparent electrode Rxb may be disposed on the insulating layer INS, and a second metal electrode Rxa may be disposed on the insulating layer INS so that it overlaps part of the second transparent electrode Rxb. The second metal electrode Rxa may also overlap part of the first transparent electrode Txb. Furthermore, the width of the first transparent electrode Txb may be greater than that of the second transparent electrode Rxb.

With reference to the examples of FIGS. 16, 18A, and 18B, the example of FIGS. 18A-18B is substantially similar to the example of FIGS. 17A-17B, except that the locations of the first metal electrode Txa and first transparent electrode Txb of each of the first electrodes Tx1-Tx4 are reversed up and down (e.g., switched vertically) and the locations of the second metal electrode Rxa and second transparent electrode Rxb of each of the second electrodes Rx1-Rx3 are reversed up and down (e.g., switched vertically). That is, the example of FIGS. 18A-18B is different from the example of FIGS. 17A-17B in that the first metal electrode Txa is disposed on the base layer BL and the first transparent electrode Txb is disposed on the base layer BL so that it covers the first metal electrode Txa. Furthermore, the example of FIGS. 18A-18B is different from the example of FIGS. 17A-17B in that the second metal electrode Rxa is disposed on the insulating layer INS and the second transparent electrode Rxb is disposed on the insulating layer INS so that it overlaps part of the second metal electrode Rxa. Accordingly, a detailed description of the redundant portions is omitted.

Unlike in the example of FIGS. 16, 17A, and 17B, the first metal electrode Txa in the example of FIGS. 18A-18B may be disposed on the base layer BL, the first transparent electrode Txb may be disposed on the base layer BL so that it covers the first metal electrode Txa, the second transparent electrode Rxb may be disposed on the insulating layer INS, and the second metal electrode Rxa may be disposed on the insulating layer INS so that it overlaps part of the second transparent electrode Rxb. In some embodiments, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed on the insulating layer INS so that it overlaps part of the second transparent electrode Rxb.

In accordance with the fingerprint sensor array according to the sixth embodiment of the present disclosure, electrical resistance can be reduced and the amount of mutual capacitance formed between the first electrodes Tx1-Tx4 and the second electrodes Rx1-Rx3 can also be secured because the first electrodes Tx1-Tx4 and the second electrodes Rx1-Rx3 include the transparent electrodes Txb and Rxb made of the transparent conductive material and the metal electrodes Txa and Rxa made of the low-resistance metal material. Accordingly, there may be an advantage in that the precision of fingerprint sensing can be improved.

Furthermore, if the fingerprint sensor array according to the sixth embodiment of the present disclosure is applied to a display device including a pixel area, the first and the second metal electrodes Txa and Rxa may be disposed to overlap a black matrix or a bank defining the pixel area of the display device, and the first opening portion and the second opening portion may be disposed to correspond to the pixel area of the display device. In this case, there may be an advantage in that resolution of the fingerprint sensor and resolution of the display device can be maintained almost identically.

A fingerprint sensor array according to a seventh embodiment of the present disclosure is described below with reference to FIGS. 19 to 21B.

Figure 19:
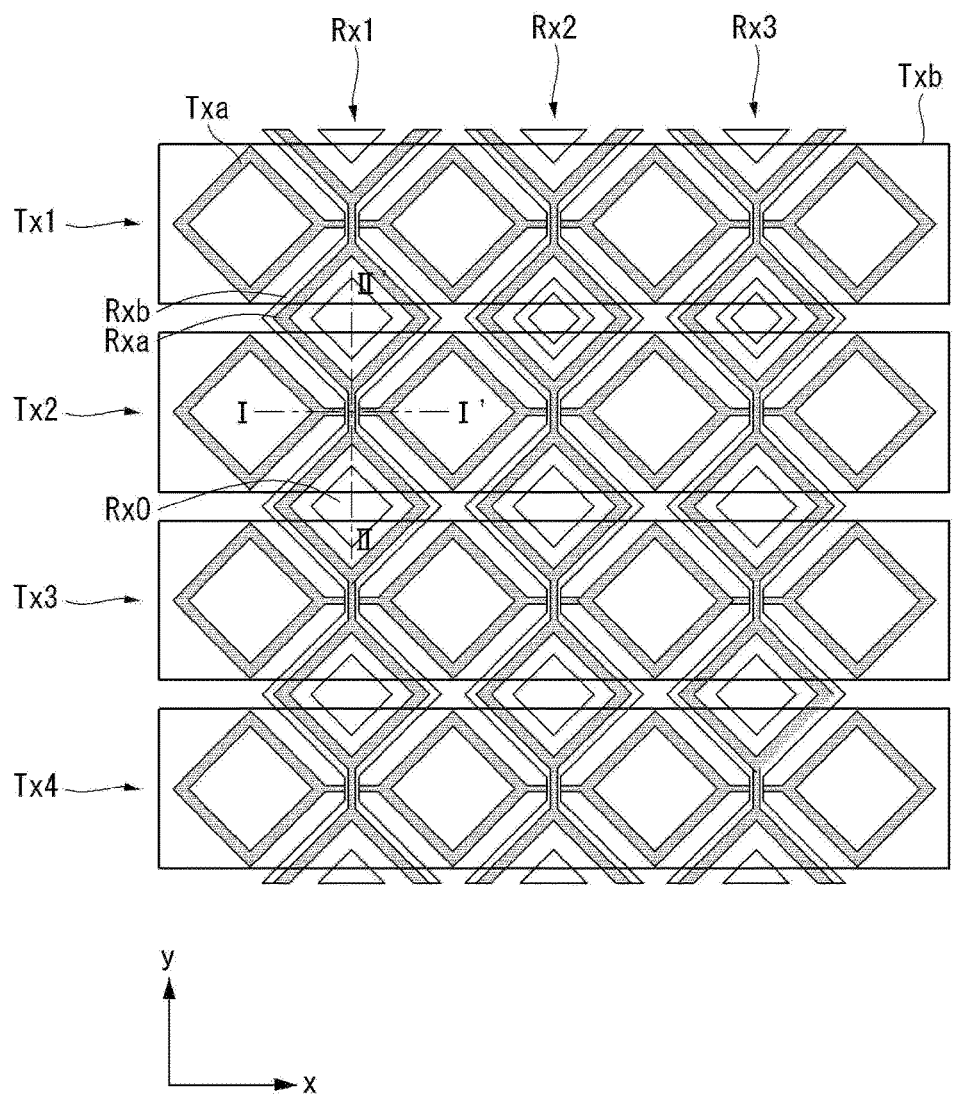
FIG. 19 is a plan view showing a fingerprint sensor array according to a seventh embodiment of the present disclosure.
Figure 20A:
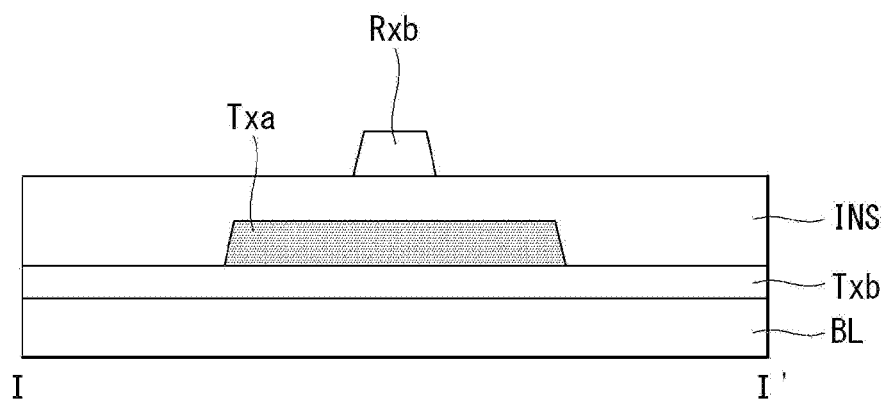
FIG. 20A shows an example of a cross-sectional view of the fingerprint sensor array, which is taken along line I-I' of FIG. 19.
Figure 20B:
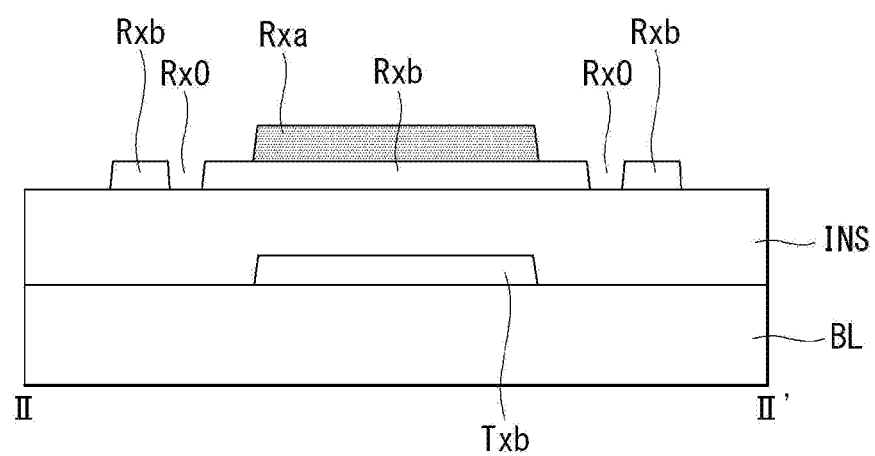
FIG. 20B shows an example of a cross-sectional view of the fingerprint sensor array, which is taken along line II-II' of FIG. 19.
Figure 21A:
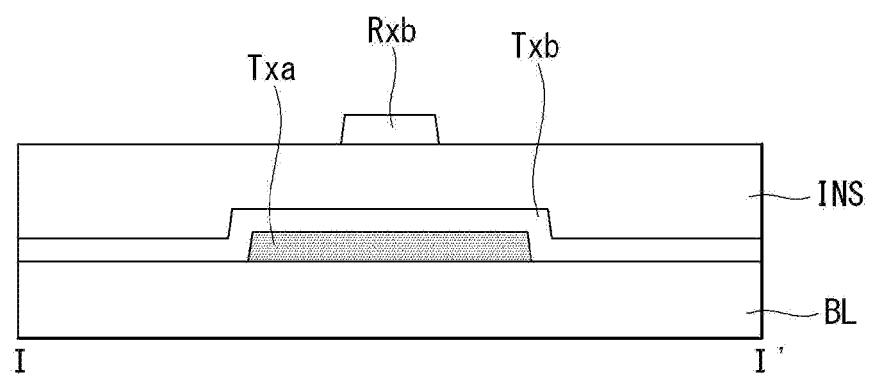
FIG. 21A shows another example of a cross-sectional view of the fingerprint sensor array, which is taken along line I-I' of FIG. 19.
Figure 21B:
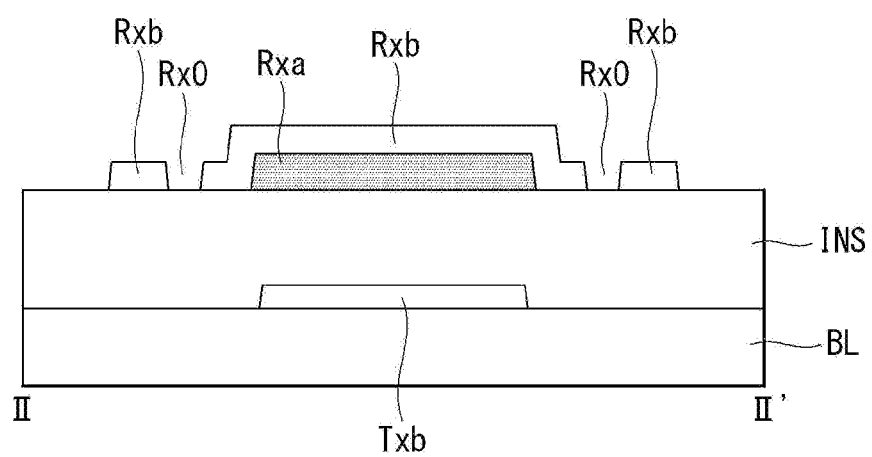
FIG. 21B shows another example of a cross-sectional view of the fingerprint sensor array, which is taken along line II-II' of FIG. 19.

FIG. 19 is a plan view showing the fingerprint sensor array according to the seventh embodiment of the present disclosure. FIG. 20A shows an example of a cross-sectional view of the fingerprint sensor array, which is taken along line I-I' of FIG. 19. FIG. 20B shows an example of a cross-sectional view of the fingerprint sensor array, which is taken along line II-II' of FIG. 19. FIG. 21A shows another example of a cross-sectional view of the fingerprint sensor array, which is taken along line I-I' of FIG. 19. FIG. 21B shows another example of a cross-sectional view of the fingerprint sensor array, which is taken along line II-II' of FIG. 19.

With reference to the examples of FIGS. 19, 20A, and 20B, first electrodes Tx1-Tx4 arranged in parallel in a first direction (e.g., an x-axis direction) and second electrodes Rx1-Rx3 arranged in parallel in a second direction (e.g., a y-axis direction) crossing the first direction may be disposed on a base layer BL. An insulating layer INS may be placed between the first electrodes Tx1-Tx4 and the second electrodes Rx1-Rx3, and may prevent an electrical contact between them.

Each of the first electrodes Tx1-Tx4 of the fingerprint sensor array according to the seventh embodiment of the present disclosure may have a substantially similar configuration as each of the first electrodes of the fingerprint sensor array according to the sixth embodiment of the present disclosure. Accordingly, a detailed description of the first electrodes Tx1-Tx4 of the fingerprint sensor array according to the seventh embodiment of the present disclosure is omitted.

Each of the second electrodes Rx1-Rx3 of the fingerprint sensor array according to the seventh embodiment of the present disclosure may have a substantially similar configuration as each of the second electrodes of the fingerprint sensor array according to the second embodiment of the present disclosure. Accordingly, a description of the second electrodes Rx1-Rx3 of the fingerprint sensor array according to the seventh embodiment of the present disclosure is omitted.

In the examples of of FIGS. 19, 20A, and 20B, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed on the insulating layer INS so that it overlaps part of the second transparent electrode Rxb. The second metal electrode Rxa may also overlap part of the first transparent electrode Txb.

With reference to the examples of FIGS. 19, 21A, and 21B, the example of FIGS. 21A-21B is the same as the example of FIGS. 20A-20B, except that the locations of the first metal electrode Txa and first transparent electrode Txb of each of the first electrodes Tx1-Tx4 are reversed up and down (e.g., switched vertically) and the locations of the second metal electrode Rxa and second transparent electrode Rxb of each of the second electrodes Rx1-Rx3 are reversed up and down (e.g., switched vertically). That is, the example of FIGS. 21A-21B is different from the example of FIGS. 20A-20B in that the first metal electrode Txa is disposed on the base layer BL and the first transparent electrode Txb is disposed on the base layer BL so that it covers the first metal electrode Txa. Furthermore, the example of FIGS. 21A-21B is different from the example of FIGS. 20A-20B in that the second metal electrode Rxa is disposed on the insulating layer INS and the second transparent electrode Rxb is disposed on the insulating layer INS so that it overlaps part of the second metal electrode Rxa. Accordingly, a detailed description of the redundant portions is omitted.

Unlike in the example of of FIGS. 19, 20A, and 20B, in the example of FIGS. 21A-21B, the first metal electrode Txa may be disposed on the base layer BL, the first transparent electrode Txb may be disposed on the base layer BL so that it covers the first metal electrode Txa, the second transparent electrode Rxb may be disposed on the insulating layer INS, and the second metal electrode Rxa may be disposed on the insulating layer INS so that it overlaps part of the second transparent electrode Rxb.

In some embodiments, the first transparent electrode Txb may be disposed on the base layer BL, the first metal electrode Txa may be disposed on the first transparent electrode Txb, the second transparent electrode Rxb may be disposed on the insulating layer INS, and the second metal electrode Rxa may be disposed on the insulating layer INS so that it overlaps part of the second transparent electrode Rxb. Part of the second metal electrode Rxa may also overlap the first transparent electrode Txb.

In accordance with the fingerprint sensor array according to the seventh embodiment of the present disclosure, electrical resistance can be reduced and the amount of mutual capacitance formed between the first electrodes Tx1-Tx4 and the second electrodes Rx1-Rx3 can also be secured because the first electrodes Tx1-Tx4 and the second electrodes Rx1-Rx3 include the transparent electrodes Txb and Rxb made of the transparent conductive material and the metal electrodes Txa and Rxa made of the low-resistance metal material. Accordingly, there may be an advantage in that the precision of fingerprint sensing can be improved.

Furthermore, if the fingerprint sensor array according to the seventh embodiment of the present disclosure is applied to a display device including a pixel area, the first and the second metal electrodes Txa and Rxa may be disposed to overlap a black matrix or a bank defining the pixel area of the display device, and the fourth opening portion Rx0 may be disposed to correspond to the pixel area of the display device. In this case, there may be an advantage in that resolution of a fingerprint sensor and resolution of the display device can be maintained almost identically.

An example in which the fingerprint sensor array according to the first to seventh embodiments of the present disclosure have been applied to the display panel of a display device is described below with reference to FIGS. 22 to 26.

Figure 22:
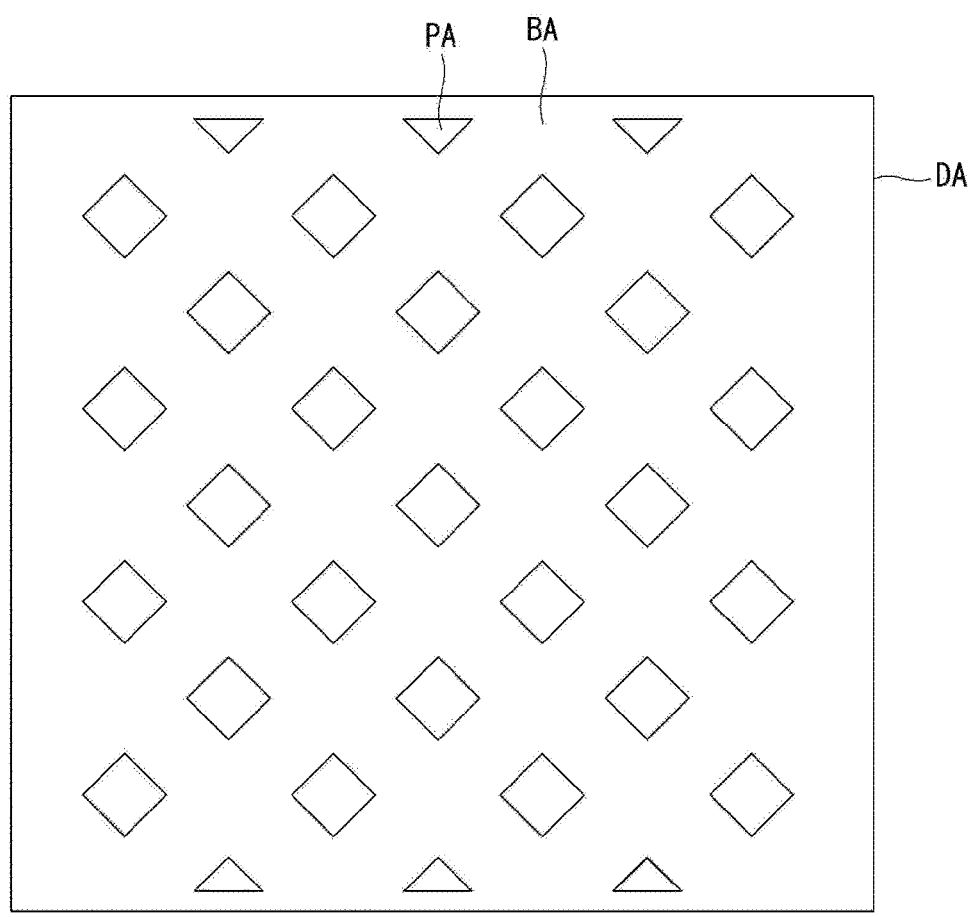
FIG. 22 is a plan view schematically showing the pixel area of a display device and the non-open area of a bank or black matrix defining the pixel area to which the fingerprint sensor array according to any one of the first to seventh embodiments of the present disclosure has been applied.

FIG. 22 is a plan view schematically showing the pixel area of a display device and the non-open area of a bank or black matrix defining the pixel area to which the fingerprint sensor arrays according to any one of the first to seventh embodiments of the present disclosure has been applied.

With reference to FIG. 22, the display device to which the fingerprint sensor array according to any one of the first to seventh embodiments of the present disclosure may be applied may include pixel areas PA, e.g., open areas in which light for displaying data is output, and a bank or black matrix area BA defining the pixel areas PA, e.g., a non-open area. The display device of FIG. 22 may include, for example, a liquid crystal display (LCD), a field emission display (FED), a plasma display panel (PDP), an organic light-emitting diode (OLED) display, and an electrophoretic display.

The base layer BL of the fingerprint sensor array according to any one of the first to seventh embodiments of the present disclosure may be any one element of a display device when it is applied to the display device. The display device to which the fingerprint sensor array according to any one of the first to seventh embodiments of the present disclosure has been applied is described in detail with reference to FIGS. 23 to 26.

Each of the display devices shown in the examples of FIGS. 23 to 26 may include a first array substrate SUB1 and a second array substrate SUB2 configured to have display elements for displaying data formed therein, a barrier film BF disposed between the first array substrate SUB1 and the second array substrate SUB2, a polarization film POL disposed on the second substrate SUB2 and configured to prevent the reflection of light incident from the outside, and a cover window CW disposed on the polarization film POL and configure to protect the display device from an external impact. If all the display elements are included in the first substrate array SUB1 in the display devices, the second substrate array SUB2 may be omitted.

In the display devices of FIGS. 23 to 26, if the display device is an OLED display, the second array substrate SUB2 may be an encapsulation plate for protecting the OLED display and may be made of a transparent and/or hard material, such as glass, or flexible polymer plastic. If the display device is an LCD, the second array substrate SUB2 may be a color filter substrate in which color filters are disposed.

Figure 23:
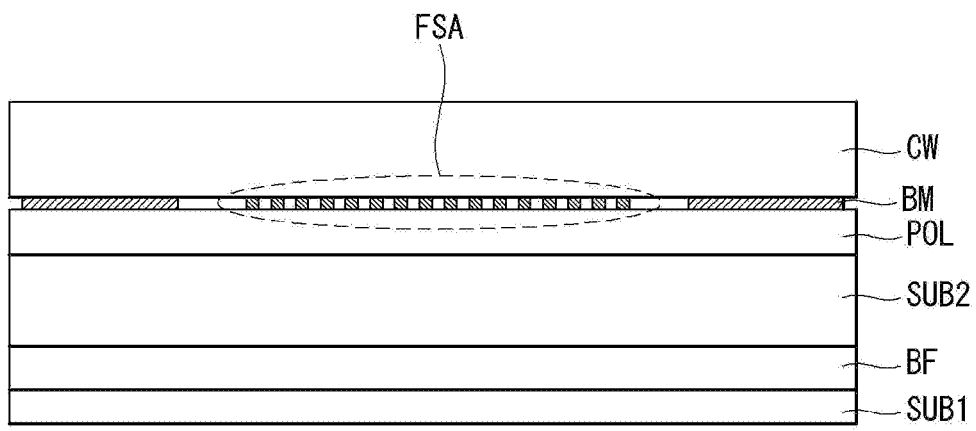
FIG. 23 is a cross-sectional view showing a first example of a display device including any one of the fingerprint sensor arrays according to the first to seventh embodiments of the present disclosure.

FIG. 23 is a cross-sectional view showing a first example of a display device including any one of the fingerprint sensor arrays according to the first to seventh embodiments of the present disclosure.

With reference to FIG. 23, one of the fingerprint sensor arrays FSA according to the first to seventh embodiments of the present disclosure may be disposed between the cover window CW and the polarization film POL. The cover window CW may become the base layer BL of the fingerprint sensor array FSA in order to reduce a thickness.

In the display device of FIG. 23, if the first and the second metal electrodes Txa and Rxa are aligned so that they are placed in the non-open area BA of the display device, there may be an advantage in that an open ratio can be maximized. Furthermore, if the first and the second metal electrodes Txa and Rxa are made of black metal, such as Cr, Mn, or Ni, there may be an advantage in that a visibility phenomenon can be improved because the reflection of the first and the second metal electrodes Txa and Rxa can be prevented.

Figure 24:
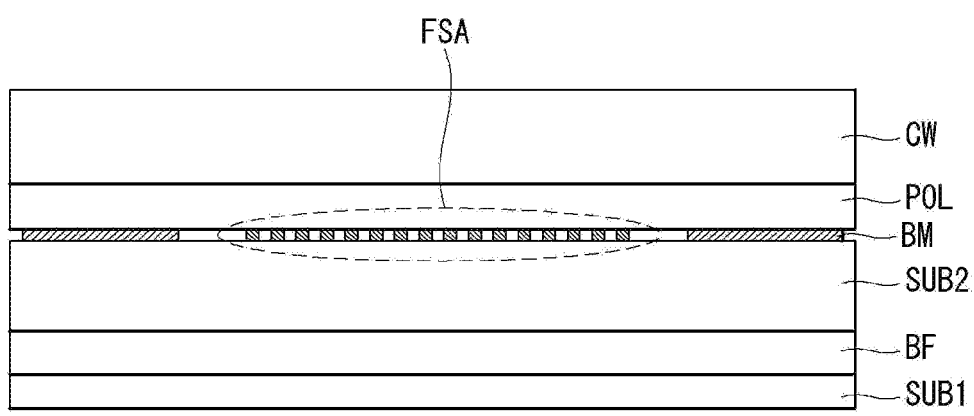
FIG. 24 is a cross-sectional view showing a second example of a display device including any one of the fingerprint sensor arrays according to the first to seventh embodiments of the present disclosure.

FIG. 24 is a cross-sectional view showing a second example of a display device including any one of the fingerprint sensor arrays according to the first to seventh embodiments of the present disclosure.

With reference to FIG. 24, one of the fingerprint sensor arrays FSA according to the first to seventh embodiments of the present disclosure may be disposed between the polarization film POL and the second array substrate SUB2. The second array substrate SUB2 may become the base layer BL of the fingerprint sensor array FSA in order to reduce thickness.

In the display device of FIG. 24, if the first and the second metal electrodes Txa and Rxa of the fingerprint sensor array FSA are aligned so that they are placed in the non-open area BA of the display device, there may be an advantage in that an open ratio can be maximized. Furthermore, the reflection of the first and the second metal electrodes Txa and Rxa can be prevented because the first and the second metal electrodes Txa and Rxa are disposed under the polarization film POL. Accordingly, there may be an advantage in that a visibility phenomenon can be improved.

Figure 25:
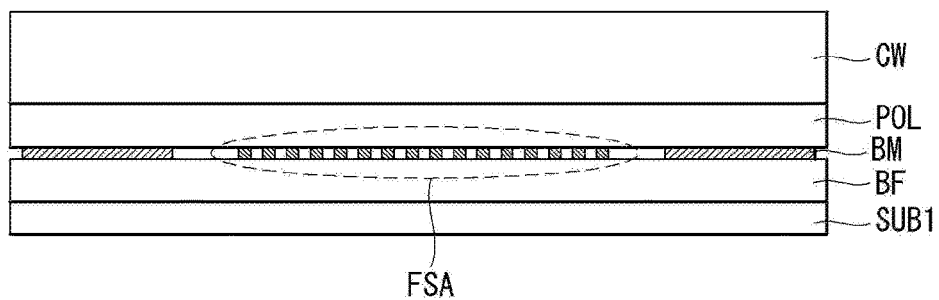
FIG. 25 is a cross-sectional view showing a third example of a display device including any one of the fingerprint sensor arrays according to the first to seventh embodiments of the present disclosure.

FIG. 25 is a cross-sectional view showing a third example of a display device including any one of the fingerprint sensor arrays according to the first to seventh embodiments of the present disclosure.

With reference to FIG. 25, one of the fingerprint sensor arrays FSA according to the first to seventh embodiments of the present disclosure may be disposed between the polarization film POL and the barrier film BF. In the display device of the FIG. 25 example, the second array substrate SUB has been omitted. The barrier film BF may become the base layer BL of the fingerprint sensor array FSA in order to reduce a thickness.

If the first and the second metal electrodes Txa and Rxa of the fingerprint sensor array FSA are aligned so that they are placed in the non-open area BA of the display device, there may be an advantage in that an open ratio can be maximized. Furthermore, the reflection of the first and the second metal electrodes Txa and Rxa can be prevented because the first and the second metal electrodes Txa and Rxa are disposed under the polarization film POL. Accordingly, there may be an advantage in that a visibility phenomenon can be improved.

Figure 26:
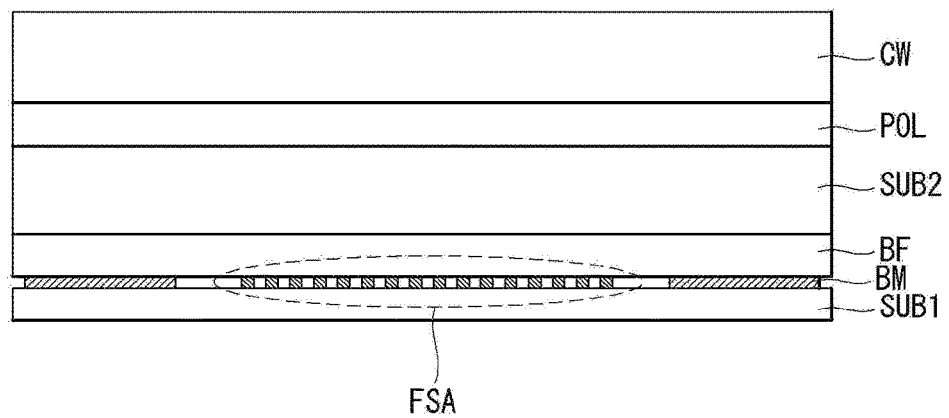
FIG. 26 is a cross-sectional view showing a fourth example of a display device including any one of the fingerprint sensor arrays according to the first to seventh embodiments of the present disclosure.

FIG. 26 is a cross-sectional view showing a fourth example of a display device including any one of the fingerprint sensor arrays according to the first to seventh embodiments of the present disclosure.

With reference to FIG. 26, one of the fingerprint sensor arrays FSA according to the first to seventh embodiments of the present disclosure may be disposed between the barrier film BF and the first array substrate SUB1. The first array substrate SUB1 may become the base layer BL of the fingerprint sensor array FSA in order to reduce a thickness.

If the first and the second metal electrodes Txa and Rxa of the fingerprint sensor array FSA are aligned so that they are placed in the non-open area BA of the display device, there may be an advantage in that an open ratio can be maximized. Furthermore, the reflection of the first and the second metal electrodes Txa and Rxa can be prevented because the first and the second metal electrodes Txa and Rxa are disposed under the polarization film POL. Accordingly, there may be an advantage in that a visibility phenomenon can be improved.

It will be apparent to those skilled in the art that various modifications and variations can be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. A fingerprint sensor array, comprising:
a plurality of first electrodes arranged in a first direction, each of the plurality of first electrodes comprising at least one of: a first transparent electrode comprising a transparent conductive material and a first metal electrode comprising a low-resistance metal material;
a plurality of second electrodes arranged in a second direction crossing the first direction, each of the plurality of second electrodes comprising at least one of: a second transparent electrode comprising the transparent conductive material and a second metal electrode comprising the low-resistance metal material; and
an insulating layer between the plurality of first electrodes and the plurality of second electrodes to insulate the first electrodes from the second electrodes,
wherein the first metal electrode comprises a first opening, and
wherein the second metal electrode comprises a second opening.

2. The fingerprint sensor array of claim 1, wherein:
each of the first electrodes further comprises:
the first transparent electrode on a base member, the first transparent electrode further comprising:
a plurality of first transparent patterns having a specific shape; and
connection parts interconnecting the plurality of first transparent patterns; and
the first metal electrode on the first transparent patterns or between the first transparent patterns and the base member, the first openings overlapping the first transparent patterns; and
each of the second electrodes further comprises:
the second transparent electrode on the insulating layer covering the first electrodes, the second transparent electrode further comprising:
a plurality of second transparent patterns having a specific shape; and
connection parts interconnecting the plurality of second transparent patterns; and
the second metal electrode on the second transparent patterns or between the first transparent patterns and the base member, the second openings overlapping the second transparent patterns.

3. The fingerprint sensor array of claim 1, wherein each of the plurality of first transparent patterns comprises a third opening portion configured to expose the base member.

4. The fingerprint sensor array of claim 3, wherein each of the plurality of second transparent patterns comprises a fourth opening portion configured to expose the insulating layer.

5. The fingerprint sensor array of claim 4, wherein a size of each of the first opening portion and the second opening portion is greater than a size of each of the third opening portion and the fourth opening portion.

6. The fingerprint sensor array of claim 1, wherein:
each of the first electrodes further comprises:
the first metal electrode on a base member; and
a plurality of first metal patterns comprising:
the first openings having a specific shape; and
connection parts interconnecting the plurality of first metal patterns; and
each of the second electrodes further comprises:
the second metal electrode on the insulating layer covering the first electrodes; and a plurality of second metal patterns comprising:
the second openings having a specific shape; and
connection parts interconnecting the plurality of second metal patterns.

7. The fingerprint sensor array of claim 1, wherein:
each of the first electrodes further comprises:
the first transparent electrode on a base member;
a plurality of first transparent patterns having a specific shape; and
connection parts interconnecting the plurality of first transparent patterns, and
each of the second electrodes further comprises:
the second transparent electrode on the insulating layer covering the first electrodes;
a plurality of second transparent patterns having a specific shape; and
connection parts interconnecting the plurality of second transparent patterns.

8. The fingerprint sensor array of claim 1, wherein:
each of the first electrodes further comprises:
the first transparent electrode on a base member, the first transparent electrode further comprising:
a plurality of first transparent patterns having a specific shape; and
connection parts interconnecting the plurality of first transparent patterns; and
the first metal electrode on the first transparent patterns or between the first transparent patterns and the base member, the first openings overlapping the first transparent patterns; and
each of the second electrodes further comprises:
the second transparent electrode on the insulating layer covering the first electrodes in a bar shape; and
the second metal electrode on the insulating layer to overlap the second transparent electrode, the second openings exposing portions of the insulating layer along with another part of the second transparent electrode.

9. The fingerprint sensor array of claim 1, wherein:
each of the first electrodes further comprises:
the first transparent electrode on a base member in a bar shape; and
the first metal electrode on the first transparent electrode or between the first transparent electrode and the base member, the first openings overlapping the first transparent electrode; and
each of the second electrodes further comprises:
the second transparent electrode on the insulating layer covering the first electrodes in a bar shape; and
the second metal electrode on the insulating layer to overlap a portion of the second transparent electrode, the second openings exposing the insulating layer.

10. The fingerprint sensor array of claim 1, wherein:
each of the first electrodes further comprises:
the first transparent electrode on a base member in a bar shape; and
the first metal electrode on a plurality of first transparent electrode or between the first transparent electrodes and the base member, the first openings overlapping the first transparent electrode;
each of the second electrodes further comprises:
the second transparent electrode on the insulating layer, the second transparent electrode further comprising:
a plurality of second transparent patterns; and
connection parts interconnecting the plurality of second transparent patterns; and the second metal electrode on the second transparent patterns or between the first transparent patterns and the insulating layer, the second openings overlapping the second transparent patterns; and
each of the second transparent patterns comprises third openings configured to expose the insulating layer.

11. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face to the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 1 is disposed between the cover window and the polarization film,
wherein the first and second metal electrodes of the fingerprint sensor array are disposed in the non-open area, and
wherein the base member of the fingerprint sensor array is the cover window.

12. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window disposed on the polarization film, the cover window being configured to protect the display device against an external impact,
wherein a fingerprint sensor array of claim 1 is disposed between the polarization film and the second substrate array,
wherein the first and second metal electrodes of the fingerprint sensor array are disposed in the non-open area, and
wherein the base member of the fingerprint sensor array is the second array substrate.

13. A display device, comprising:
a first array substrate comprising:
pixel areas comprising open areas in which light for displaying data is output;
a non-open area surrounding the pixel areas; and
display elements configured to display the data disposed in the first array substrate;
a barrier film on the first array substrate;
a polarization film on the first array substrate, the polarization film being configured to prevent a reflection of externally incident light; and a cover window on the polarization film, the cover window being configured to protect the display device against an external impact, wherein a fingerprint sensor array of claim 1 is disposed between the polarization film and the barrier film, wherein the first and second metal electrodes of the fingerprint sensor array are disposed in the non-open area, and wherein the base member of the fingerprint sensor array is the barrier film.

14. A display device, comprising:
a first array substrate comprising:
  pixel areas comprising open areas in which light for displaying data is output;
  a non-open area surrounding the pixel areas; and
  display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 1 is disposed between the barrier film and the first substrate array,
wherein the first and second metal electrodes of the fingerprint sensor array are disposed in the non-open area, and
wherein the base member of the fingerprint sensor array is the first substrate array or the barrier film.

15. A display device, comprising:
a first array substrate comprising:
  pixel areas comprising open areas in which light for displaying data is output;
  a non-open area surrounding the pixel areas; and
  display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 2 is disposed between the barrier film and the first substrate array,
wherein the first and second metal electrodes of the fingerprint sensor array are disposed in the non-open area, and
wherein the base member of the fingerprint sensor array is the first substrate array or the barrier film.

16. A display device, comprising:
a first array substrate comprising:
  pixel areas comprising open areas in which light for displaying data is output;
  a non-open area surrounding the pixel areas; and
  display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 3 is disposed between the barrier film and the first substrate array,
wherein the first and second metal electrodes of the fingerprint sensor array are disposed in the non-open area, and
wherein the base member of the fingerprint sensor array is the first substrate array or the barrier film.

17. A display device, comprising:
a first array substrate comprising:
  pixel areas comprising open areas in which light for displaying data is output;
  a non-open area surrounding the pixel areas; and
  display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 4 is disposed between the barrier film and the first substrate array,
wherein the first and second metal electrodes of the fingerprint sensor array are disposed in the non-open area, and
wherein the base member of the fingerprint sensor array is the first substrate array or the barrier film.

18. A display device, comprising:
a first array substrate comprising:
  pixel areas comprising open areas in which light for displaying data is output;
  a non-open area surrounding the pixel areas; and
  display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 5 is disposed between the barrier film and the first substrate array,
wherein the first and second metal electrodes of the fingerprint sensor array are disposed in the non-open area, and
wherein the base member of the fingerprint sensor array is the first substrate array or the barrier film.

19. A display device, comprising:
a first array substrate comprising:
  pixel areas comprising open areas in which light for displaying data is output;

a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 6 is disposed between the barrier film and the first substrate array,
wherein the first and second metal electrodes of the fingerprint sensor array are disposed in the non-open area, and
wherein the base member of the fingerprint sensor array is the first substrate array or the barrier film.

20. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 7 is disposed between the barrier film and the first substrate array,
wherein the first and second metal electrodes of the fingerprint sensor array are disposed in the non-open area, and
wherein the base member of the fingerprint sensor array is the first substrate array or the barrier film.

21. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 8 is disposed between the barrier film and the first substrate array,
wherein the first and second metal electrodes of the fingerprint sensor array are disposed in the non-open area, and
wherein the base member of the fingerprint sensor array is the first substrate array or the barrier film.

22. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 9 is disposed between the barrier film and the first substrate array,
wherein the first and second metal electrodes of the fingerprint sensor array are disposed in the non-open area, and
wherein the base member of the fingerprint sensor array is the first substrate array or the barrier film.

23. A display device, comprising:
a first array substrate comprising:
pixel areas comprising open areas in which light for displaying data is output;
a non-open area surrounding the pixel areas; and
display elements configured to display the data in the first and the second array substrates;
a second array substrate configured to face the first array substrate;
a barrier film between the first array substrate and the second array substrate;
a polarization film on the second array substrate, the polarization film being configured to prevent a reflection of externally incident light; and
a cover window on the polarization film, the cover window being configured to protect the display device against an external impact,
wherein a fingerprint sensor array of claim 10 is disposed between the barrier film and the first substrate array,
wherein the first and second metal electrodes of the fingerprint sensor array are disposed in the non-open area, and
wherein the base member of the fingerprint sensor array is the first substrate array or the barrier film.

* * * * *